US011504692B2

(12) United States Patent
Lai et al.

(10) Patent No.: US 11,504,692 B2
(45) Date of Patent: Nov. 22, 2022

(54) MULTIFUNCTIONAL INTENSIFIED REACTOR DEVICE WITH INTEGRATED HEAT AND MASS TRANSFER

(71) Applicant: UT-BATTELLE, LLC, Oak Ridge, TN (US)

(72) Inventors: Canhai Lai, Knoxville, TN (US); Lonnie J. Love, Knoxville, TN (US); James E. Parks, II, Knoxville, TN (US); Xin Sun, Knoxville, TN (US); Constantinos Tsouris, Oak Ridge, TN (US); Michael Matuszewski, Canonsburg, PA (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 151 days.

(21) Appl. No.: 16/892,949

(22) Filed: Jun. 4, 2020

(65) Prior Publication Data

US 2021/0077978 A1 Mar. 18, 2021

Related U.S. Application Data

(60) Provisional application No. 62/913,764, filed on Oct. 11, 2019, provisional application No. 62/866,018, filed on Jun. 25, 2019.

(51) Int. Cl.
*B01J 19/32* (2006.01)
*B01D 53/14* (2006.01)
*B01D 53/18* (2006.01)

(52) U.S. Cl.
CPC .......... *B01J 19/32* (2013.01); *B01D 53/1475* (2013.01); *B01D 53/1493* (2013.01);
(Continued)

(58) Field of Classification Search
CPC .............. B01J 19/32; B01J 2219/00763; B01J 2219/00873; B01J 2219/3221;
(Continued)

(56) References Cited

U.S. PATENT DOCUMENTS

| | | | | |
|---|---|---|---|---|
| 2,861,432 A | * | 11/1958 | Haselden | B01D 3/28 62/646 |
| 4,096,214 A | * | 6/1978 | Percevaut | B01J 19/32 261/112.2 |
| 5,316,628 A | * | 5/1994 | Collin | F28D 21/0015 159/901 |

OTHER PUBLICATIONS

Miramontes et al., "Additively manufactured packed bed device for process intensification of CO2 absorption and other chemical processes", Chemical Engineering Journal, 388 (2020) 124092.
(Continued)

*Primary Examiner* — Lessanework Seifu
(74) *Attorney, Agent, or Firm* — Fox Rothschild LLP

(57) ABSTRACT

A packing device for mass and heat transfer with a subject fluid includes a housing having opposing ends, and subject fluid openings at each opposing end defining a subject fluid flow path for at least one subject fluid flowing through the packing device. A plurality of mass and heat transfer plates each include an interior heat exchange fluid channel disposed between interior heat transfer surfaces of the mass and heat transfer plates. A heat exchange fluid inlet and fluid outlet can supply and remove heat exchange fluid to the heat exchange fluid channels of the mass and heat transfer plates. The mass and heat transfer plates can be oriented to define there between fluid flow channels for the subject fluid. A method and system for mass and heat transfer with a subject fluid, and a method and system for the removal of $CO_2$ from a gas stream are disclosed.

20 Claims, 27 Drawing Sheets

(52) U.S. Cl.
CPC .... *B01D 53/18* (2013.01); *B01D 2252/20484* (2013.01); *B01D 2252/20489* (2013.01); *B01J 2219/00763* (2013.01); *B01J 2219/00873* (2013.01); *B01J 2219/3221* (2013.01); *B01J 2219/32275* (2013.01); *B01J 2219/3325* (2013.01)

(58) Field of Classification Search
CPC ...... B01J 2219/32275; B01J 2219/3325; B01J 2219/32237; B01D 53/18
See application file for complete search history.

(56) References Cited

OTHER PUBLICATIONS

Sholl, D.S.; Lively, R.P. Seven Chemical Separations to Change the World. Nature, 532, 435-437 (Apr. 28, 2016).

Structured Packings for Distillation, Absorption and Reactive, Sulzer Chemtech, Distillationhttps://www.sulzer.com/-/media/files/products/separationtechnology/liquid_liquid_extraction/brochures/structured_packings.ashx.

RVT Structured packings for mass and heat transfer processes, http://rvtpe.com/wpcontent/uploads/2015/09/RVT_Structured_Packings_150601.pdf.

Spiegel, L.; Bomio, P.; Hunkeler, R. Direct heat and mass transfer in structured packings Chemical Engineering and Processing: Process Intensification, vol. 35, Issue 6, Dec. 1996, pp. 479-485.

C. Le Quéré et. al., Global Carbon Budget 2018, Earth System Science Data. 10 (2018) 2147-2194.

D. Aaron, C. Tsouris, Separation of $CO_2$ from Flue Gas: a Review, Separation Science and Technology. 40 (2005) 321-348.

J. Oexmann, A. Kather, S. Linnenberg, U. Liebenthal, Post-combustion $CO_2$ capture: chemical absorption processes in coal-fired steam power plants, Greenhouse Gases: Science and Technology. 2 (2012) 80-98.

Aroonwilas, A. Veawab, Characterization and Comparison of the $CO_2$ Absorption Performance into Single and Blended Alkanolamines in a Packed Column, Industrial & Engineering Chemistry Research 43 (2004) 2228-2237.

Han, C. Zhou, J. Wu, D.J. Tempel, H. Cheng, Understanding $CO_2$ Capture Mechanisms in Aqueous Monoethanolamine via First Principles Simulations, The Journal of Physical Chemistry Letters. 2 (2011) 522-526.

J. Mackowiak, C. Hall, Fluid Dynamics of Packed Columns Principles of the Fluid Dynamic Design of Columns for Gas/Liquid and Liquid/Liquid Systems, Springer Berlin, Berlin, 2013.

G. Gottlicher, R. Pruschek, Comparison of $CO_2$ Removal Systems for Fossil-Fuelled Power Plant Processes, Energy Conversion and Management, 38 (1997) S173-S178.

J.T. Yeh, H.W. Pennline, K.P. Resnik, Study of $CO_2$ Absorption and Desorption in a Packed Column, Energy & Fuels. 15 (2001) 274-278.

Z. Anxionnaz, M. Cabassud, C. Gourdon, P. Tochon, Heat exchanger/reactors (HEX reactors): Concepts, technologies: State-of-the-art, Chemical Engineering and Processing: Process Intensification. 47 (2008) 2029-2050.

Veawab, A. Aroonwilas, A. Chakma, and P. Tontiwachwuthikul, Solvent Formulation for $CO_2$ Separation from Flue Gas Streams. University of Regina. S4S OA2. https://www.netl.doe.gov/publications/proceedings/01/carbon_seq/2b4.pdf (Accessed May 2019).

Y.-H. Kim, L.K. Park, S. Yiacoumi, C. Tsouris, Modular Chemical Process Intensification: A Review, Annual Review of Chemical and Biomolecular Engineering. 8 (2017) 359-380.

T.F. Degnan, J. Wei, Monolithic Reactor-Heat Exchanger, ACS Symposium Series Chemical Reaction Engineering—Houston. (1978) 83-97.

T.F. Degnan, J. Wei, The Co-current reactor-heta exchanger part II. Experimental results, AIChE Journal. 26 (1980) 60-67.

H. Bakhtiary-Davijany, F. Hayer, X.K. Phan, R. Myrstad, H.J. Venvik, P. Pfeifer, et al., Characteristics of an Integrated Micro Packed Bed Reactor-Heat Exchanger for methanol synthesis from syngas, Chemical Engineering Journal. 167 (2011) 496-503.

X. Guo, Y. Fan, L. Luo, Multi-channel heat exchanger-reactor using arborescent distributors: a characterization study of fluid distribution, heat exchange performance and exothermic reaction. Energy. 69 (2014) 728-741.

C. Parra-Cabrera, C. Achille, S. Kuhn, R. Ameloot, 3D printing in chemical engineering and catalytic technology structured catalysts, mixers and reactors, Chemical Society Reviews. 47 (2018) 209-230.

D. Espalin, D.W. Muse, E. Macdonald, R.B. Wicker, 3D Printing multifunctionality: structures with electronics, The International Journal of Advanced Manufacturing Technology. 72 (2014) 963-978.

S. Bolton, A. Kasturi, S. Palko, C. Lai, L. Love, J. Parks, X. Sun, C. Tsouris, 3D Printed Structures for Optimized Carbon Capture Technology in Packed Bed Columns, Separation Science and Technology. 2019;54(13):2047-2058.

W. Wagner, A Pruß, The IAWPS Formulation 1995 for the Thermodynamic Properties of Ordinary Water Substance for General and Scientific Use, Journal of Physical and Chemical Reference Data. 31, (2002) 387-535.

Blachly CH, Ravner H. The Stabilization of Monoethanolamine Solutions for Submarine Carbon Dioxide Scrubbers. 1964.

Danckwerts P. The Reaction of $CO_2$ with Ethanolamines. Insights Into Chemical Engineering. 1981:208-212.

Hikita H, Asai S, Ishikawa H, Honda M. The kinetics of reactions of carbon dioxide with monoethanolamine, diethanolamine and triethanolamine by a rapid mixing method. The Chemical Engineering Journal. 1977;13(1):7-12.

Kvamsdal HM, Rochelle GT. Effects of the Temperature Bulge in $CO_2$ Absorption from Flue Gas by Aqueous Monoethanolamine. Industrial & Engineering Chemistry Research. 2008;47(3):867-875.

Galindo P, Schaffer A, Brechtel K, Unterberger S, Scheffknecht G. Experimental research on the performance of CO2-loaded solutions of MEA and DEA at regeneration conditions. Fuel. 2012;101:2-8.

Chi S, Rochelle GT. Oxidative Degradation of Monoethanolamine. Industrial & Engineering Chemistry Research. 2002;41(17):4178-4186.

Vlasogiannis P, Karagiannis G, Argyropoulos P, Bontozoglou V. Air-water two-phase flow and heat transfer in a plate heat exchanger. International Journal of Multiphase Flow. 2002;28(5):757-772.

\* cited by examiner

MULTIFUNCTIONAL INTENSIFIED REACTOR DEVICE WITH INTEGRATED HEAT AND MASS TRANSFER

CROSS-REFERENCE TO RELATED APPLICATIONS

This application claims priority to U.S. Provisional Patent Application No. 62/913,764 filed on Oct. 11, 2019, and U.S. Provisional Patent Application No. 62/866,018 filed on Jun. 25, 2019, both entitled "Multifunctional Intensified Reactor Device with Integrated Heat and Mass Transfer", the entire disclosures of which are incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to methods and apparatus for mass transfer, and more particularly to methods and apparatus for mass and heat transfer.

BACKGROUND OF THE INVENTION

In 2018, global $CO_2$ emissions are estimated to have increased to 37.1±1.8 Gt per year, a 2.7% increase from the previous year. Progress towards decarbonization to achieve the IPCC's target of an average temperature increase to below 1.5° C. has not yet been successful. Carbon capture and storage (CCS) has been pursued as a viable short-term solution that targets fossil fuel combustion emissions, which account for 88% of global carbon emissions.

There are several available $CO_2$ capture methods which can be categorized into pre-combustion, post-combustion, and oxy-fuel combustion capture using solvents, sorbents, membranes, $CO_2$ hydrate, and other materials and processes. Some of the methods investigated, however, are prohibitively costly or speculative. Absorption is well understood, having been in use since the 1970s, and the energy penalty is second only to oxy-fuel combustion $CO_2$ capture. Moreover, it is easier to retrofit into existing facilities than the other technologies. These qualities have attracted considerable attention from researchers, and many consider absorption to be one of the most promising carbon capture technologies available. The technology, however, has not yet been commercialized, as the energy penalty and cost remain far from economically viable. Further improvements to this technology are the subject of the current study.

Absorption processes separate $CO_2$ from flue gas by contacting it with a solvent whose chemical properties enable it to selectively capture $CO_2$. Aqueous solutions of alkanolamines such as monoethanolamine (MEA), diethanolamine (DEA), or diisopropanolamine (DIPA) are the most well attested solvents for carbon capture, but other families such as sterically hindered amines or ionic liquids have also been explored. MEA is the preferred solvent because of its high absorption rate of $CO_2$. The absorption reaction between MEA and $CO_2$ can be represented by the following balanced reversible chemical equation:

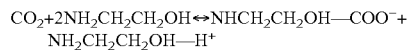

To remove $CO_2$ from flue gas, $CO_2$-lean MEA solution is pumped into the top of an absorption column (absorber), where it flows counter-currently with flue gas. $CO_2$-rich MEA solution exits from the bottom and proceeds to a desorption vessel (desorber), where it is heated for regeneration. $CO_2$-lean MEA solution is then pumped back into the absorber. In this way, the solvent can be continuously recycled, which reduces operation costs.

Enhancing gas-liquid interactions significantly enhances mass transfer, so increasing the gas-liquid contact area per unit volume is desirable. Packed columns are the most commonly employed technology for accomplishing this task. In addition to increasing contact area, packed columns have a high gas capacity and a relatively low pressure drop. These properties make packed columns desirable for carbon capture.

There are two different types of packed columns: those with structured packing and those with random packing. Random packing consists of small structures, typically rings or ring-like structures, that increase the surface area inside a packed column. The small structures are randomly distributed inside the column, hence the name. Examples include Raschig Rings (Raschig USA, Inc. Arlington, Tex.), Pall Rings (The Pall Ring Company, Ltd, Norfolk, United Kingdom), and Dixon Rings. Structured packing typically consists of corrugated sheets designed to force fluids through defined paths. Examples include Mellapak 250 and Sulzer BX (Sulzer Ltd., Winterthur, Switzerland), and Ralu Pak 250 (Raschig USA, Inc., Arlington Tex.). Structured packing is preferred for carbon capture because it has been shown to improve absorption efficiency and absorption rate over random packing. The prior art structures cannot perform, in an in-situ manner, either the removal of heat accumulated in the column due to an exothermic chemical reaction, nor the addition of heat to enhance the rate of an endothermic chemical reaction.

Despite being considered one of the least costly $CO_2$ capture methods, absorption still imposes a substantial energy penalty on a power plant. The energy penalty has been calculated by others as being 0.155 kWh/lb $CO_2$. The largest component of the energy consumed by the process is in the regeneration of the solvent, a consequence of the high heat of desorption of MEA. The energy required to pump the solvent and the energy required to compress $CO_2$ after it exits the desorber also consume significant amounts of energy. MEA has a heat-dependent tendency to degrade due to the formation of oxazolidones and diamines. This risk limits the regeneration temperature, which increases the heat duty of the reboiler, and increases material costs by necessitating replacement of the solvent. There will also be a pressure drop between the bottom of the column and the top due to the packing elements creating resistance to the flow of flue gas. The pressure drop will determine the size of the blower needed since a higher pressure drop means a blower has to work harder to achieve the desired flow conditions.

The relatively high reaction rate of MEA with $CO_2$ is desirable, but carries significant drawbacks. The forward reaction is thermodynamically favored under low temperature and high $CO_2$ partial pressure, and it is highly exothermic. Conversely, at high temperature and low partial pressure, the reaction reverses in the desorption direction, and is endothermic. The reverse reaction is useful for regenerating the solvent; however, it presents a problem for absorption because if the reaction temperature increases, the kinetics will favor desorption, thus inhibiting the absorption efficiency. This occurs during the absorption of $CO_2$ by MEA due to the highly exothermic character of the reaction. The heat released by the reaction can accumulate in the absorber and the temperature can rise to exceed 80° C. Previous studies have shown that at a temperature of 90° C., 50% of the absorbed $CO_2$ is desorbed, and if the temperature rises further to 100° C., 96% of the absorbed carbon is released.

It is evident that the thermodynamics of the MEA absorption reaction pose one of the most significant hurdles to the widespread adoption of amine absorption technology. However, this also presents an opportunity to vastly improve the energy efficiency of absorption technology by devising a method for dissipating heat generated by the reaction. Lower temperature will produce a higher $CO_2$ capture rate per unit energy.

Process intensification emerged as a distinct trend in chemical engineering during the 1970s. A universal description remains elusive, however, size reduction of chemical plants, mitigation of environmental impact, improved energy efficiency, improved safety, and multifunctionality have all been identified as important facets. Multifunctionality is of particular interest in light of the challenges posed by $CO_2$ absorption. The combination of reaction and heat exchange has precedent in the literature, also dating back to the 1970s. One of the first examples of a heat exchanger-reactor (HEX) is a monolithic structure developed by Degnan and Wei. The structure consisted of four monoliths composed of reaction channels deposited with pelleted catalysts sandwiched in between coolant channels arranged in series. The objective was to remove excess heat from the oxidation of CO, which is a highly exothermic reaction. This early example of HEX demonstrated that isothermal operation of the oxidation reaction was achieved by using a coolant stream running concurrently to the reactant stream.

More recently, micro-channel reactors have been extensively studied. These small channel reactors have a higher surface area to volume ratio which enhances heat transfer and allows higher reaction rates. A prime example of this variant was developed by Bakhtiary-Davijany et al. to improve the efficiency of the synthesis of methanol from syngas. This reaction is also highly exothermic which results in lower equilibrium and the formation of undesirable products. This modular heat exchanger reactor was composed of small reaction slits sandwiched in between cross flow oil channels. The design was able to achieve isothermal operation of the reaction, and it was found that the reaction channel temperature could effectively be controlled by the temperature of the heat transfer oil.

Other arrangements have been studied, such as a multi-channel heat exchanger reactor. This reactor uses branching distributors, or "arborescent," that split into parallel channels as reactor channels. The parallel channels are suspended in a chamber where utility fluid is circulated to control the temperature. An evaluation of the flow distribution showed that it approaches uniformity which encourages good mixing properties. The total pressure drop was relatively low, but the geometry of the design was not optimized and could yield yet lower pressure drop. Most significantly, an application test on a sulfuric acid and sodium hydroxide neutralization reaction demonstrated that the reaction conditions could be effectively controlled by perturbing the flow rate of the coolant fluid. Isothermal operation was achieved for this highly exothermic reaction.

These selected examples demonstrate that the heat exchanger reactor is a well attested concept, supported by several decades of research. Heat exchanger reactors been proven to be effective at cooling or heating the components of a reaction, and have often enabled reactions to run isothermally. The conditions can be controlled by variation of coolant fluid properties, which opens the possibility of thermostatic control of reaction conditions.

Additive manufacturing, also known as 3D Printing or Rapid Prototyping, is a class of manufacturing technology that produces objects by depositing or sintering material in coordinates defined by digital modeling software. Additive manufacturing allows for almost seamless transition between a digital model and its physical realization. Commercial additive manufacturing technology contains software that automatically slices a 3D model into individual layers, the size of which is a limiting factor for the size of features, although layer thickness as small as 1 pm is possible with some kinds of printers. These layers are then deposited by the printer and the object is built up layer by layer.

The layer-based construction and the transition between modeling and physical object remove many of the fetters inherent in traditional manufacturing. Engineers are no longer limited by the kind of mold that can be built, or by the physical constraints of cutting tools. Almost anything that can be modeled using Computer Aided Design (CAD) can be manufactured, which gives engineers unparalleled design flexibility.

Additive manufacturing also allows for exotic geometries to be manufactured, such as the Schoen Gyroid, which can be used as a porous bed structure for an alternative heat exchanger design. Such structures may have substantial advantages over conventional geometries, but they are prohibitively difficult to manufacture by conventional means due to their internal labyrinthine structure. With the advent of additive manufacturing, these structures can now be explored.

SUMMARY OF THE INVENTION

A packing device for mass and heat transfer with a subject fluid, can include a housing having opposing ends, and subject fluid openings at each opposing end defining a subject fluid flow path for at least one subject fluid flowing through the packing device. A plurality of mass and heat transfer plates each include opposing mass and heat transfer sides, the mass and heat transfer sides comprising interior heat transfer surfaces and exterior mass and heat transfer surfaces for contacting the at least one subject fluid, and an interior heat exchange fluid channel disposed between the interior heat transfer surfaces of the mass and heat transfer sides. A heat exchange fluid inlet is provided for supplying heat exchange fluid to the heat exchange fluid channels of the mass and heat transfer plates, and a heat exchange fluid outlet is provided for removing heat exchange fluid from the heat exchange fluid channels of the mass and heat transfer plates. The mass and heat transfer plates can be oriented with the exterior mass and heat transfer surfaces aligned with the subject fluid flow path and to the exterior mass and heat transfer surfaces of adjacent mass and heat transfer plates, such that the mass and heat transfer plates define there between fluid flow channels for the subject fluid.

The mass and heat transfer plates can be corrugated. The corrugations can be offset from the flow path at an acute angle. The offset between the corrugations of adjacent mass and heat transfer plates can be from 30 to 150 degrees. The corrugations of adjacent mass and heat transfer plates can include joined portions. The joined portions can be interpenetrating. The mass and heat transfer plates can include alternating corrugated plates and non-corrugated plates. The exterior mass and heat transfer surfaces can include projecting portions.

The contact surface area between the heat exchange fluid channel and the interior heat transfer surfaces of the mass and heat transfer sides of a mass and heat transfer plate can comprise from 10% of the surface area of the exterior mass and heat transfer surfaces of the plate. The contact surface area between the heat exchange fluid channel and the interior heat transfer surfaces of the mass and heat transfer sides of a mass and heat transfer plate can comprise at least 90% of the surface area of the exterior mass and heat transfer surfaces of the plate. The interior heat transfer surfaces of the mass and heat transfer sides and the heat exchange fluid channel can be planar and parallel.

The housing can be tubular and can comprise an annular heat exchange fluid inlet manifold and an annular heat exchange fluid outlet manifold at the opposing ends of the housing. The annular heat exchange fluid inlet manifold communicates between the heat exchange fluid inlet and the heat exchange fluid channels of the mass and heat transfer plates. The annular heat exchange fluid outlet manifold communicates between the heat exchange fluid channels of the mass and heat transfer plates and the heat exchange fluid outlet.

A method for mass and heat transfer with a subject fluid can include the step of providing a packing device for mass and heat transfer. The packing device includes a housing having opposing ends, and subject fluid openings at each opposing end defining a subject fluid flow path for at least one subject fluid flowing through the packing device. A plurality of mass and heat transfer plates each comprise opposing mass and heat transfer sides. The mass and heat transfer sides have interior heat transfer surfaces and exterior mass and heat transfer surfaces for contacting the subject fluid. An interior heat exchange fluid channel is disposed between the interior heat transfer surfaces of the mass and heat transfer sides. A heat exchange fluid inlet is provided for supplying heat exchange fluid to the heat exchange fluid channels of the mass and heat transfer plates. A heat exchange fluid outlet is provided for removing heat exchange fluid from the heat exchange fluid channels of the mass and heat transfer plates. The mass and heat transfer plates can be oriented with the exterior mass and heat transfer surfaces aligned with the subject fluid flow path and to the exterior mass and heat transfer surfaces of adjacent mass and heat transfer plates, such that the mass and heat transfer plates define there between fluid channels for the subject fluid.

The subject fluid is directed through the packing device wherein the subject fluid will contact the exterior mass and heat transfer surfaces of the mass and heat transfer plates. A heat exchange fluid is flowed from the heat exchange fluid inlet and through the heat exchange fluid channels of the mass and heat transfer plates and through the heat exchange fluid outlet. The heat exchange fluid will exchange heat with the mass and heat transfer sides of the mass and heat transfer plates and the subject fluid, and the subject fluid will undergo a mass change.

A second fluid can be flowed through the packing device countercurrent to the subject fluid. The subject fluid can have a phase different from the phase of the second fluid. The subject fluid can be a gas, and the second fluid can be a liquid. The second fluid can include an aqueous solution of an alkanolamine, and the subject fluid gas can include $CO_2$.

A method for separating $CO_2$ from a gas stream according to the invention includes the step of providing a packing device for mass and heat transfer. The packing device includes a housing having opposing ends, and liquid openings at each opposing end defining a liquid flow path for a liquid capable of reacting with $CO_2$ flowing through the packing device. A plurality of mass and heat transfer plates each comprise opposing mass and heat transfer sides. The mass and heat transfer sides include interior heat transfer surfaces and exterior mass and heat transfer surfaces for contacting the liquid, and an interior cooling fluid channel disposed between the interior heat transfer surfaces of the mass and heat transfer sides. A cooling fluid inlet is provided for supplying cooling fluid to the cooling channels of the mass and heat transfer plates, and a cooling fluid outlet is provided for removing cooling fluid from the cooling fluid channels of the mass and heat transfer plates. The mass and heat transfer plates can be oriented with the mass and heat transfer surfaces aligned with the transfer fluid flow path and to the mass and heat transfer surfaces of adjacent mass and heat transfer plates. The mass and heat transfer plates define there between fluid channels for the liquid and the gas stream.

The liquid and a gas stream comprising $CO_2$ are flowed through the packing device in countercurrent flow, where the liquid will contact the gas in the fluid channels and adjacent the mass and heat transfer surfaces of the mass and heat transfer plates. A cooling fluid is flowed from the cooling fluid inlet and through the cooling channels of the mass and heat transfer plates. The liquid will react with the gas to remove $CO_2$ from the gas and generate heat, and the liquid and the gas will exchange that heat with the mass and heat transfer sides of the mass and heat transfer plates, and thereby the cooling fluid flowing through the cooling channels, and the $CO_2$ will be removed with the liquid. The liquid can include an aqueous solution of at least one alkanolamine. The alkanolamine can comprise at least one selected from the group consisting of monoethanolamine (MEA), diethanolamine (DEA), and diisopropanolamine (DIPA).

A system for mass and heat transfer with a subject fluid includes a subject fluid source, a heat exchange fluid source, and a column. The column can include a packing device for mass and heat transfer. The packing device comprises a housing having opposing ends, and subject fluid openings at each opposing end defining a transfer fluid flow path for a subject fluid sourced at the subject fluid source. The subject fluid flows through the packing device. A plurality of mass and heat transfer plates each comprise opposing mass and heat transfer sides and side edges. The mass and heat transfer sides comprise interior heat transfer surfaces and exterior mass and heat transfer surfaces for contacting the subject fluid. An interior heat exchange fluid channel is disposed between the interior heat transfer surfaces of the mass and heat transfer sides, wherein heat exchange fluid is sourced at the heat exchange fluid source. A heat exchange fluid inlet is provided for supplying the heat exchange fluid to the heat exchange fluid channels of the mass and heat transfer plates, and a heat exchange fluid outlet is provided for removing heat exchange fluid from the heat exchange fluid channels of the mass and heat transfer plates. The mass and heat transfer plates can be oriented with the exterior mass and heat transfer surfaces aligned with the subject fluid flow path and to the exterior mass and heat transfer surfaces of adjacent mass and heat transfer plates. The mass and heat transfer plates define there between fluid flow channels for the subject fluid.

A first supplemental packing device for mass transfer is disposed between the subject fluid source and the packing device for mass and heat transfer and coupled to the packing device for mass and heat transfer proximal to its heat exchange fluid inlet. The first packing device is configured to supply to the packing device for mass and heat transfer the subject fluid at a first temperature. A second supplemental packing device for mass transfer can be coupled to the packing device for mass and heat transfer proximal to its heat exchange fluid outlet. The second packing device can be configured to receive, and remove away, from the packing device for mass and heat transfer the subject fluid at a second temperature different from the first temperature by a target temperature difference.

The system can further include a second fluid source. The second fluid can be flowed through the packing devices of the column countercurrent to the subject fluid. The heat exchange fluid source can include a conduit for connecting to an external heat exchange fluid source. The heat exchange fluid source can include a heat exchanger. The heat exchanger receives heat exchange fluid from the heat exchange fluid outlet of the packing device, exchanges heat with the heat exchange fluid, and returns the heat exchange fluid to the heat exchange fluid inlet of the packing device for mass and heat transfer.

At least one of the first and second supplemental packing devices can be directly connected to the packing device for mass and heat transfer. A second packing device for mass and heat transfer can be provided. At least one of the first and second supplemental packing devices can be interposed between the packing devices for mass and heat transfer.

A packing device for mass and heat transfer with a subject fluid includes a housing having opposing ends, and subject fluid openings at each opposing end defining a transfer fluid flow axis for at least one subject fluid flowing through the packing device. A plurality of mass and heat transfer packing structures can be provided within the housing each comprising interior heat transfer surfaces and exterior mass and heat transfer surfaces for contacting the subject fluid, and an interior heat exchange fluid channel disposed between the interior heat transfer surfaces of the mass and heat transfer sides. The packing structures can include a heat exchange fluid inlet for supplying heat exchange fluid to the heat exchange fluid channels of the packing structures, and a heat exchange fluid outlet for removing heat exchange fluid from the packing structures.

BRIEF DESCRIPTION OF THE DRAWINGS

There are shown in the drawings embodiments that are presently preferred it being understood that the invention is not limited to the arrangements and instrumentalities shown, wherein:

FIG. 18 A is a plot of temperature (° C.) vs. column height (in), without cooling. FIG. 18 B is a plot of temperature (° C.) vs. column height (in), with cooling.

FIG. 20B—1.81 LPM; FIG. 20C—2.26 LPM.

DETAILED DESCRIPTION OF THE INVENTION

Figure 1:
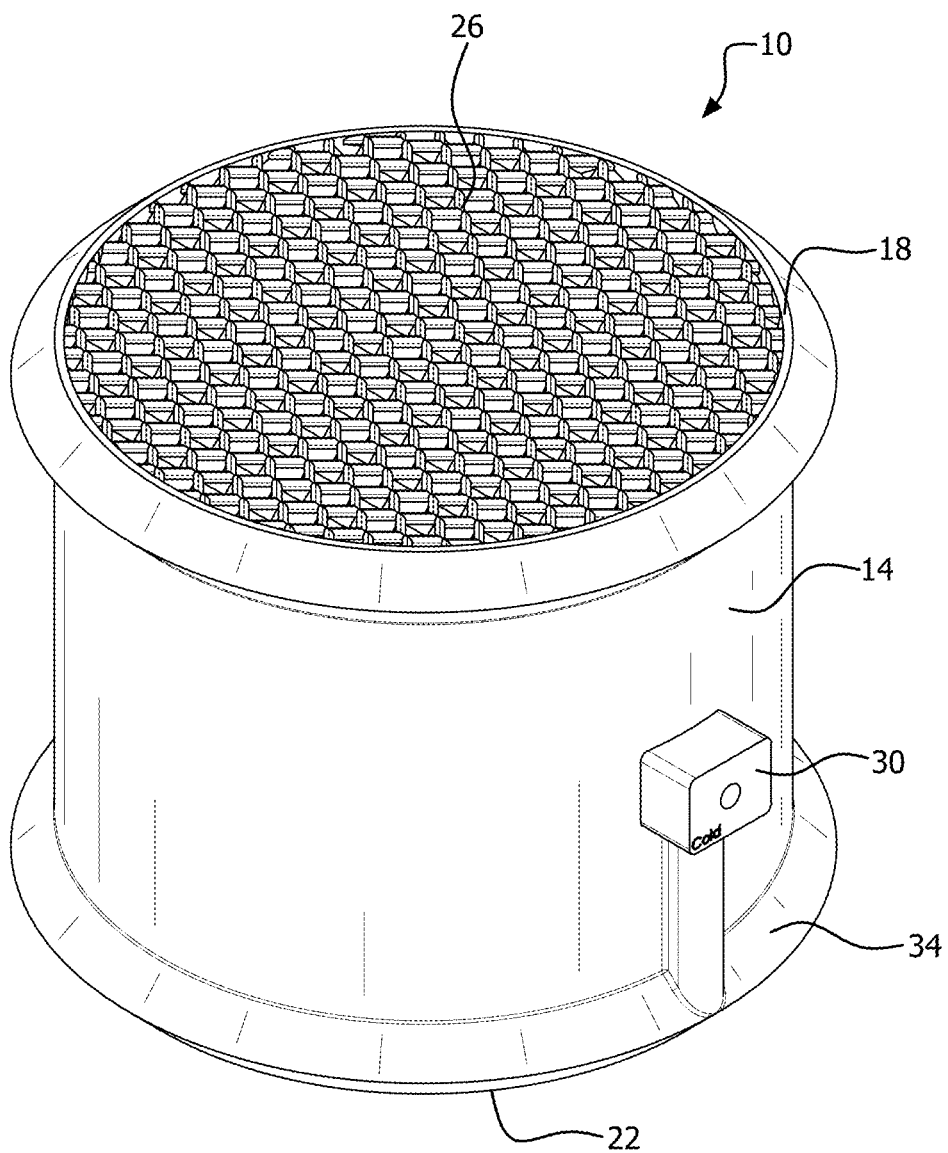
FIG. 1 is a right side perspective view of a packing device for conducting mass and heat transfer with a subject fluid.
Figure 2:
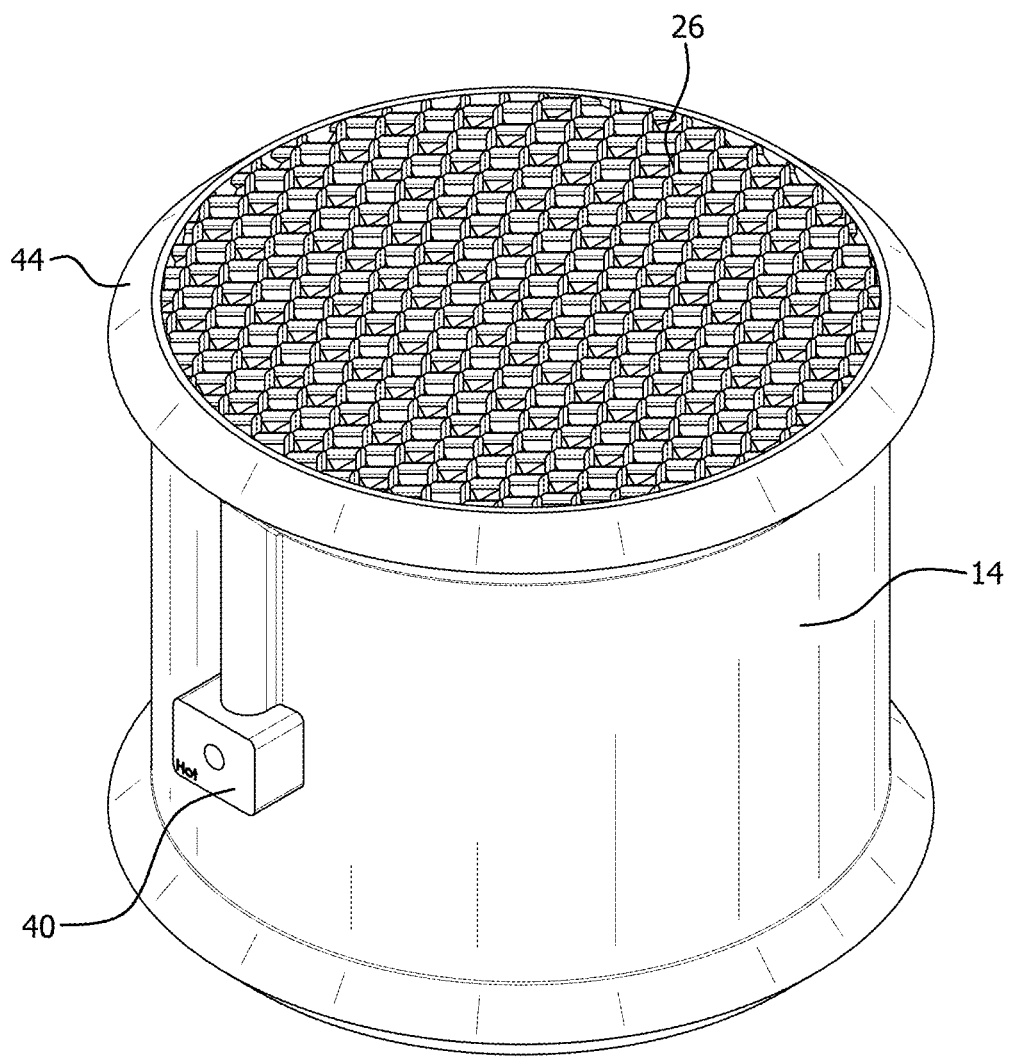
FIG. 2 is a left side perspective view of a packing device according to the invention.
Figure 3:
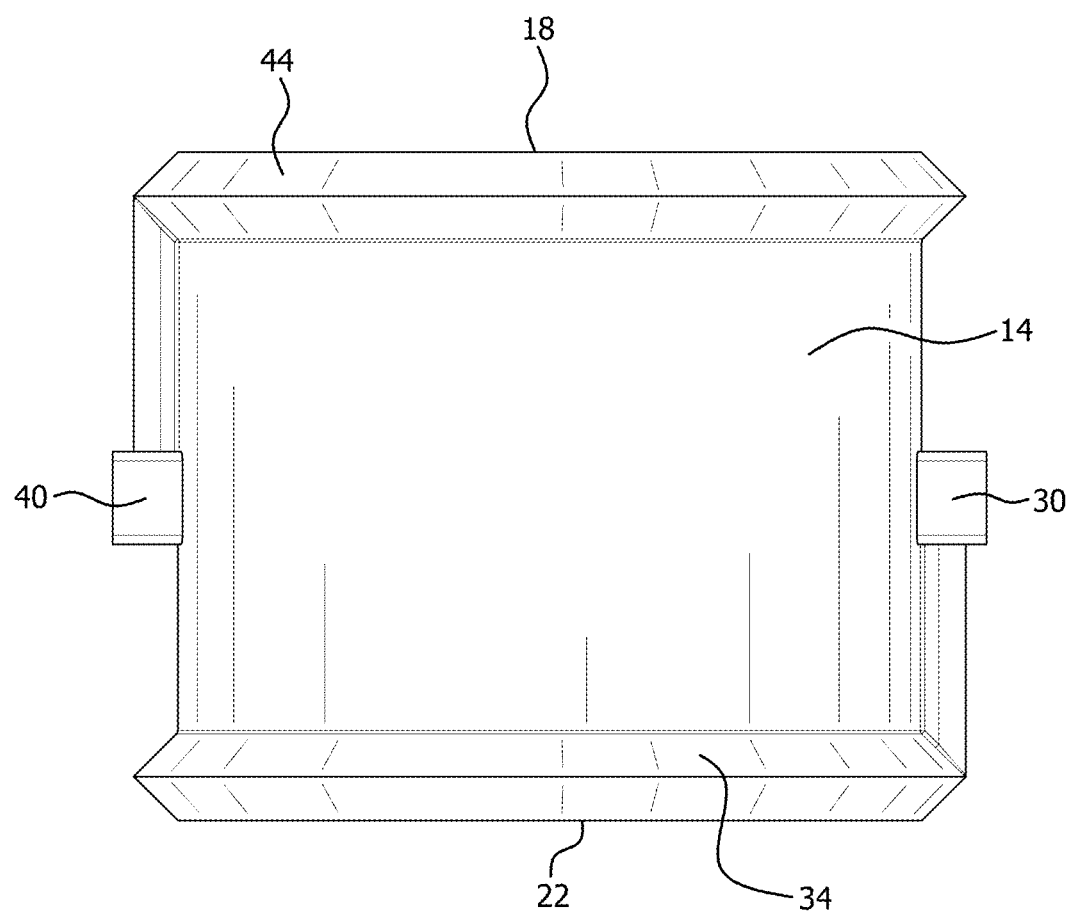
FIG. 3 is a front elevation.

A packing device for mass and heat transfer with a subject fluid according to the invention can include a housing having opposing ends, and subject fluid openings at each opposing end defining a subject fluid flow path for at least one subject fluid flowing through the packing device. A plurality of mass and heat transfer plates each have opposing mass and heat transfer sides. The mass and heat transfer sides include interior heat transfer surfaces and exterior mass and heat transfer surfaces for contacting the subject fluid. An interior heat exchange fluid channel is disposed between the interior heat transfer surfaces of the mass and heat transfer sides.

A heat exchange fluid inlet is provided for supplying heat exchange fluid to the heat exchange fluid channels of the mass and heat transfer plates. A heat exchange fluid outlet is provided for removing heat exchange fluid from the heat exchange fluid channels of the mass and heat transfer plates.

The mass and heat transfer plates can be oriented with the exterior mass and heat transfer surfaces aligned with the subject fluid flow path and to the exterior mass and heat transfer surfaces of adjacent mass and heat transfer plates. The alignment of the plates does not have to be parallel to the flow axis of the subject fluid through the packing device, and can be anywhere that is between the parallel and the perpendicular so long as an suitable flow path for the subject fluid through the packing device is created. The mass and heat transfer plates define there between fluid flow channels for the subject fluid, and also for a mass and heat transfer fluid that might be flowed countercurrently to remove a target compound in the subject fluid.

The exterior mass and heat transfer surfaces can include projecting portions that project outwardly from the mass and heat transfer sides into the flow path of the subject fluid to increase the surface are of contact between the subject fluid and the mass and heat transfer fluid. The mass and heat transfer plates can be corrugated such that the corrugations form the projections. Other kinds of projections are possible, such as baffles or semispherical projections. The corrugated plates are coupled together so that (i) there is room for the fluids to flow through channels formed between adjacently arranged corrugated plates, and (ii) corrugations of one plate go down the device in opposite direction compared to corrugations of the adjacent plate. The corrugated plates may also have a rough surface for enhanced surface area and holes of a few mm in diameter for the gas to escape. The corrugations can be offset from the flow axis through the packing device at an acute angle. The offset between the corrugations of adjacent mass and heat transfer plates can be from 30 to 150 degrees. The corrugations of adjacent mass and heat transfer plates can include joined portions. The joined portions can be interpenetrating. The mass and heat transfer plates can also include alternating corrugated plates and non-corrugated plates.

The contact surface area between the heat exchange fluid channel and the interior heat transfer surfaces of the mass and heat transfer sides of a mass and heat transfer plate comprises at least 10% of the surface area of the exterior mass and heat transfer surfaces of the plate. The contact surface area between the heat exchange fluid channel and the interior heat transfer surfaces of the mass and heat transfer sides of a mass and heat transfer plate can comprise 10, 20, 30, 40, 50, 60, 70, 80, 90, 95, 99 and 100% of the surface area of the exterior mass and heat transfer surfaces of the plate, or can be within a range of any high value and low value selected from these values. A larger surface area provides for more heat transfer.

The interior heat transfer surfaces of the mass and heat transfer sides and the heat exchange fluid channel can be planar and parallel. The heat exchange fluid channel formed between the sides will be similarly be planar, although the planes may zigzag with the corrugations of the sides.

The housing of the packing device can be tubular. The housing can include a heat exchange fluid inlet manifold and a heat exchange fluid outlet manifold at the opposing ends of the housing. The inlet manifold and the outlet manifold can be annular. The annular heat exchange fluid inlet manifold can communicate between the heat exchange fluid inlet and the heat exchange fluid channels of the mass and heat transfer plates. The annular heat exchange fluid outlet manifold can communicate between the heat exchange fluid channels of the mass and heat transfer plates and the heat exchange fluid outlet. The number, size and density of the plates can be selected to control such process parameters as pressure drop, volumetric flow, and to prevent flooding. The dimensions of the plates for example can decrease to ½ nominal or increase to 1.5 nominal or more to increase or decrease, respectively, the contact area of the packing device The heat exchange fluid can be any suitable fluid. The heat transfer fluid can be a liquid or a gas. Water can be used to remove heat for an exothermic reaction. Steam can be used to supply heat to an endothermic reaction. Other heat exchange fluids are possible.

A method for mass and heat transfer with a subject fluid can include the step of providing a packing device for mass and heat transfer according to the invention. The subject fluid is directed through the packing device wherein the subject fluid will contact the exterior mass and heat transfer surfaces of the mass and heat transfer plates. A heat exchange fluid is flowed from the heat exchange fluid inlet and through the heat exchange fluid channels of the mass and heat transfer plates and through the heat exchange fluid outlet. The heat exchange fluid will exchange heat with the mass and heat transfer sides of the mass and heat transfer plates and the subject fluid, and the subject fluid will undergo a mass change.

A second fluid which can be a mass and heat transfer fluid can be flowed through the packing device countercurrent to the subject fluid. The subject fluid can have a phase different from the phase of the second fluid. The subject fluid can be a liquid, and the second fluid can be a gas. The subject fluid can include an aqueous solution of an alkanolamine. The gas can include $CO_2$.

The second fluid can be a mass and heat transfer fluid that exchanges mass with the subject fluid, and also exchanges heat with the mass and heat transfer surfaces. The mass and heat transfer surfaces can exchange mass, as in an adsorption process, but in most cases will not directly exchange mass but instead will only provide a surface for increased surface area or provide for agitation to facilitate mass transfer between the first and second fluids. The mass and heat transfer fluid is capable of removing at least one target component from the subject fluid. For example, the subject fluid can be an industrial waste gas, the target component can be $CO_2$ in a subject fluid that is an industrial waste gas stream, and the mass and heat transfer fluid can be an aqueous solution of an alkanolamine that is capable of removing the target $CO_2$ component from the subject fluid industrial waste gas stream.

The chemical nature of the removal of the target component from the subject fluid can vary, for example a chemical reaction and an adsorption process. Many target component separation methods for many different target components are known and can be used with the invention. The process of removal of the target component can be exothermic or endothermic, and heat management with the packing device of the invention can significantly improve the kinetics of the process. The invention can be utilized so as to either supply heat or remove heat as required by the particular separation process that is utilized. The invention can also be used for the separation of a target component from a single subject fluid without a second fluid, such as in distillation processes.

The invention can be used as part of a system and method for the removal of $CO_2$, as part of a program to reduce $CO_2$ emissions in the gas stream. A method for separating $CO_2$ from a gas stream includes the steps of providing a packing device for mass and heat transfer according to the invention. A liquid capable of reacting with $CO_2$ is caused to flow through the packing device. A gas stream comprising $CO_2$ is caused to flow through the packing device in countercurrent flow to the liquid stream. The liquid will contact the gas in the fluid channels and adjacent the mass and heat transfer surfaces of the mass and heat transfer plates. The liquid will react with the gas to remove $CO_2$ from the gas and generate heat. A heat exchange cooling fluid is flowed from the heat exchange fluid inlet and through the heat exchange fluid channels of the mass and heat transfer plates. The liquid and the gas will exchange heat with the mass and heat transfer sides of the mass and heat transfer plates and thereby the heat exchange cooling fluid flowing through the cheat exchange fluid channels. The $CO_2$ will thereby be removed from the gas by the liquid with greater efficiency.

The liquid that is used to remove the $CO_2$ can comprises an aqueous solution of at least one alkanolamine. The alkanolamine can include at least one selected from the group consisting of monoethanolamine (MEA), diethanolamine (DEA), and diisopropanolamine (DIPA). The alkanolamine (MEA) solution can range between 10 and 100% MEA.

A system for mass and heat transfer with a subject fluid can include a packing device according to the invention. A subject liquid source supplies subject liquid to the packing device. A heat exchange fluid source is also provided. The packing device can be provided in a column. A first supplemental packing device which does not have to be a packing device according to the invention but can rather be a different or prior art packing device, is disposed between the subject liquid source and the packing device for mass and heat transfer. The supplemental packing device can be coupled to the packing device for mass and heat transfer proximal to its heat exchange fluid inlet. The first supplemental packing device is configured to supply to the packing device for mass and heat transfer the subject liquid at a first temperature. A second supplemental packing device for mass transfer can be coupled to the packing device for mass and heat transfer proximal to its heat exchange fluid outlet. The second supplemental packing device can be configured to receive, and remove away from, the packing device for mass and heat transfer the subject liquid at a second temperature different from the first temperature by a target temperature difference.

The heat exchange fluid source can include a conduit for connecting to an external heat exchange fluid source. The heat exchange fluid source can include a heat exchanger. The heat exchanger receives heat exchange fluid from the heat exchange fluid outlet of the packing device, exchanges heat with the heat exchange fluid, and returns the heat exchange fluid to the heat exchange fluid inlet of the packing device for mass and heat transfer. Alternatively the system may not include a heat exchanger for the heat exchange fluid. At least one of the first and second supplemental packing devices can be directly connected to the packing device for mass and heat transfer. The system can include a second packing device according to the invention for mass and heat transfer. At least one of the first and second supplemental packing devices is interposed between the packing devices for mass and heat transfer, that is, packing devices according to the invention can alternate with structured packing of the prior art.

A packing device for mass and heat transfer with a subject fluid can include a housing having opposing ends, and subject fluid openings at each opposing end defining a transfer fluid flow axis for at least one subject fluid flowing through the packing device. A plurality of mass and heat transfer packing structures within the housing can each comprise interior heat transfer surfaces and exterior mass and heat transfer surfaces for contacting the subject fluid. An interior heat exchange fluid channel is disposed between the interior heat transfer surfaces of the mass and heat transfer sides. The packing structures comprising a heat exchange fluid inlet for supplying heat exchange fluid to the heat exchange fluid channels of the packing structures, and a heat exchange fluid outlet for removing heat exchange fluid from the packing structures.

There is shown in FIGS. 1-14 a packing device 10 according to the invention. The packing device 10 includes a housing 14 having a first open end 18 and a second open end 22 to define a flow axis through the housing 14. Heat and mass transfer plates 26 are provided in the housing 14 so as to contact the fluid flowing through the housing. Heat exchange fluid enters the housing 14 through a heat exchange fluid inlet 30 and a heat exchange fluid inlet manifold 34. Heat exchange fluid leaves the packing device 10 through a heat exchange fluid outlet 40 and a heat exchange fluid outlet manifold 44.

Figure 4:
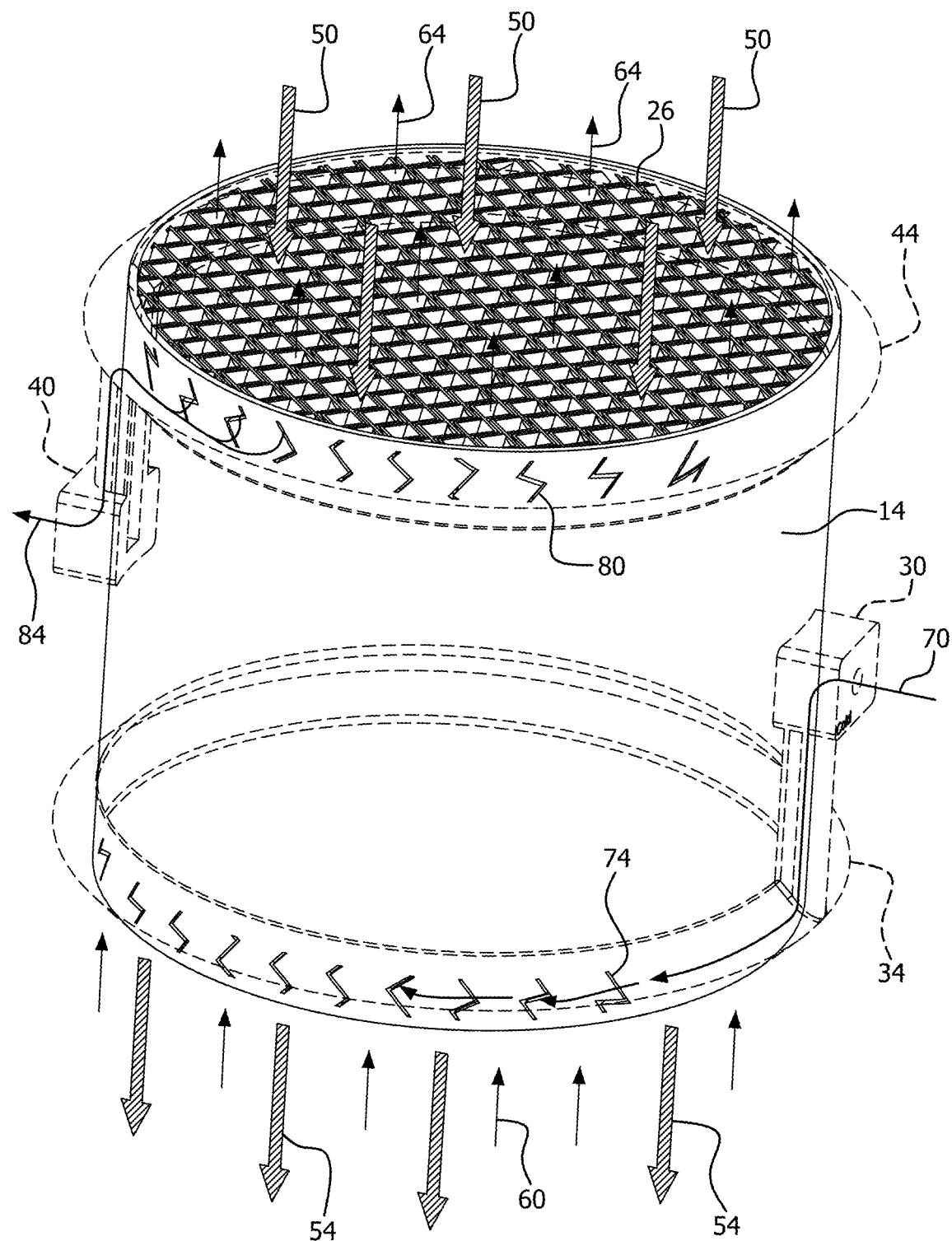
FIG. 4 is a perspective view, partially broken away and partially in phantom.

Operation of the packing device 10 is shown in FIG. 4. The subject fluid 60 enters the packing device in one direction with a target component and a second or mass and heat transfer fluid 50 for removing the target component enters the housing 14 in countercurrent flow so as to thoroughly contact the subject fluid 60. The subject fluid 60 and the second fluid 50 pass over the mass and heat transfer surfaces of the mass and heat transfer plates 26. A heat exchange fluid such as water stream 70 enters the heat exchange fluid inlet 30 and the heat exchange fluid inlet manifold 34. Openings 74 are provided to permit the heat exchange fluid to enter heat exchange fluid channels 160 (FIG. 11) of the heat and mass transfer plates 26 from the heat exchange fluid inlet manifold 34. The heat exchange fluid exchanges heat with the mass and heat transfer fluid and the subject fluid through the mass and heat transfer surfaces of the plates 26. The heat exchange fluid exits at outlet openings 80 into the heat exchange fluid outlet manifold 44, and flows through the heat exchange fluid outlet 40 as an output stream 84. The subject fluid exits the housing 14 as an exit stream 64 and the mass and heat exchange fluid exits the housing 14 as an exit stream 54.

Figure 5:
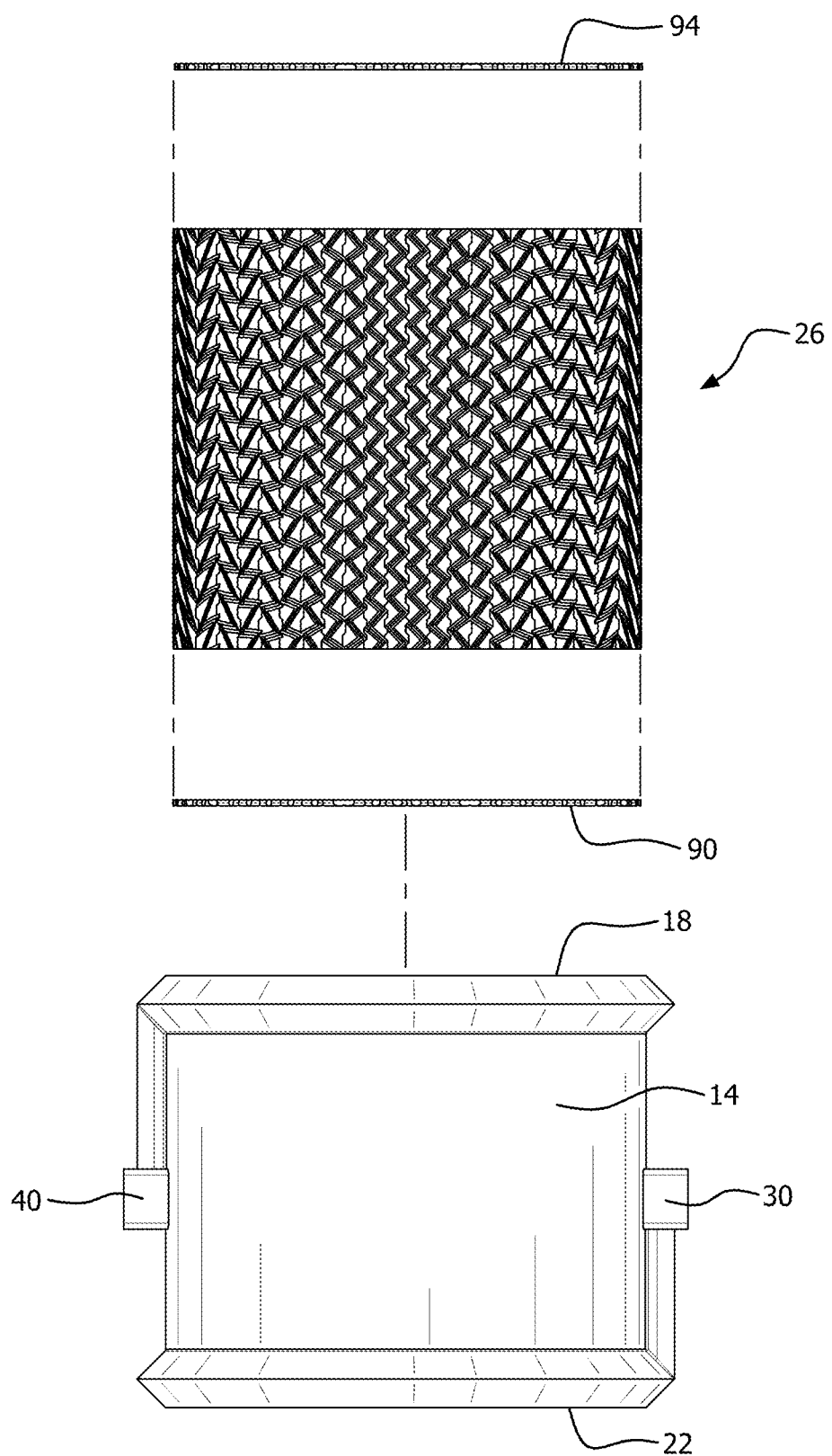
FIG. 5 is an exploded perspective view, partially in phantom.

As shown particularly in FIGS. 5-19, the mass and heat transfer plates 26 are comprised of opposing plate surfaces defining at least one heat exchange fluid channel 160 in each mass and heat transfer plate. Each plate can comprise end cap structure 90 and 94 (FIG. 5). In one embodiment, the individual heat and mass transfer plates making up the mass and heat transfer plate assembly 26 are constructed through an additive manufacturing process, in which case the end cap structures 90 and 94 are integral with remaining portions of the heat and mass transfer plates 26. Similarly, the mass and heat transfer plate assembly 26 can be formed by an additive manufacturing process and individual plates can be in part integrally connected to other plates to form an integrated plate assembly 26 comprising many individual plates. It is also possible to form the mass and heat transfer plates as separate individual plates and assemble the plates together by suitable methods such as mechanical means, adhesives or welding to form a plate assembly 26.

Figure 6:
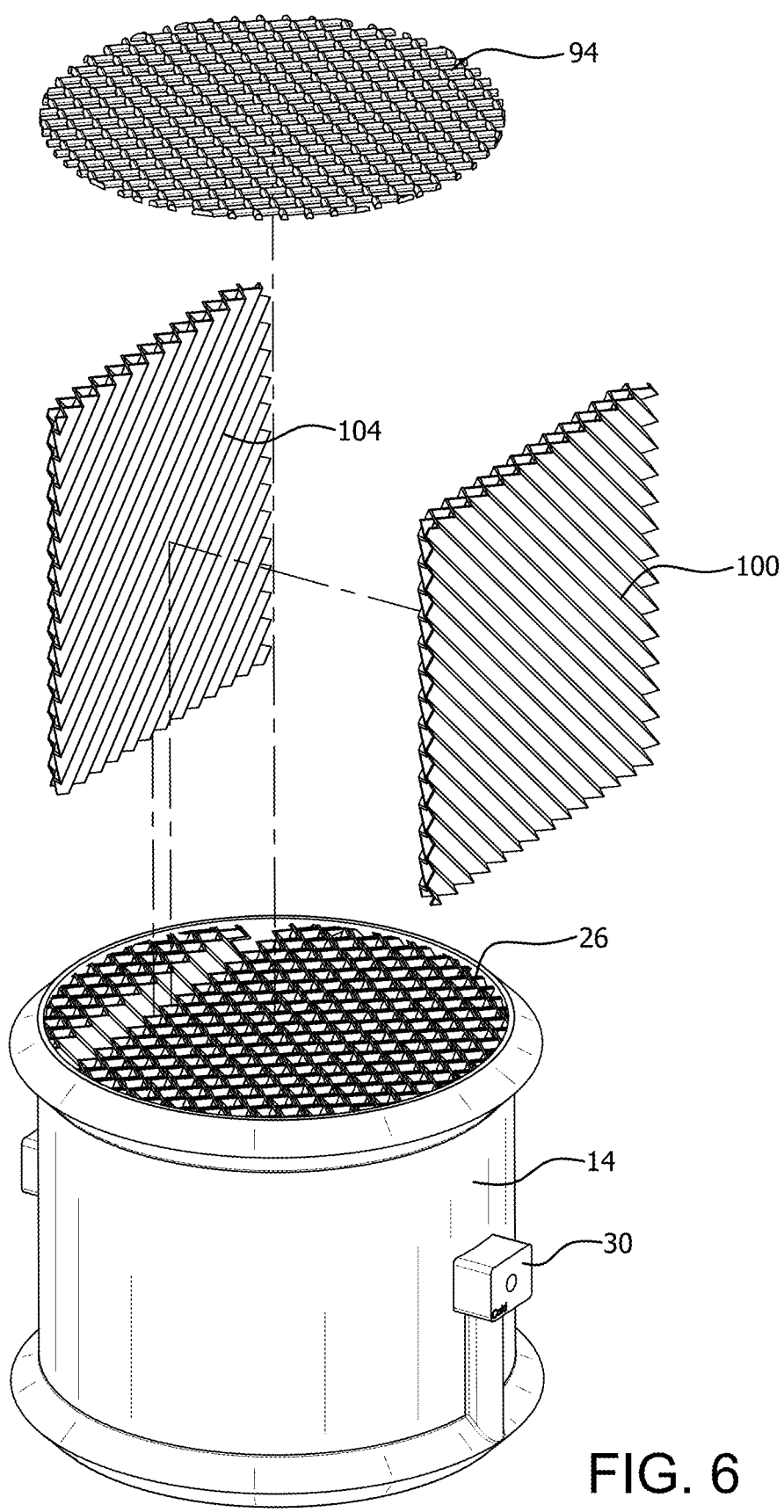
FIG. 6 is an exploded perspective showing exploded mass and heat transfer plates.
Figure 7:
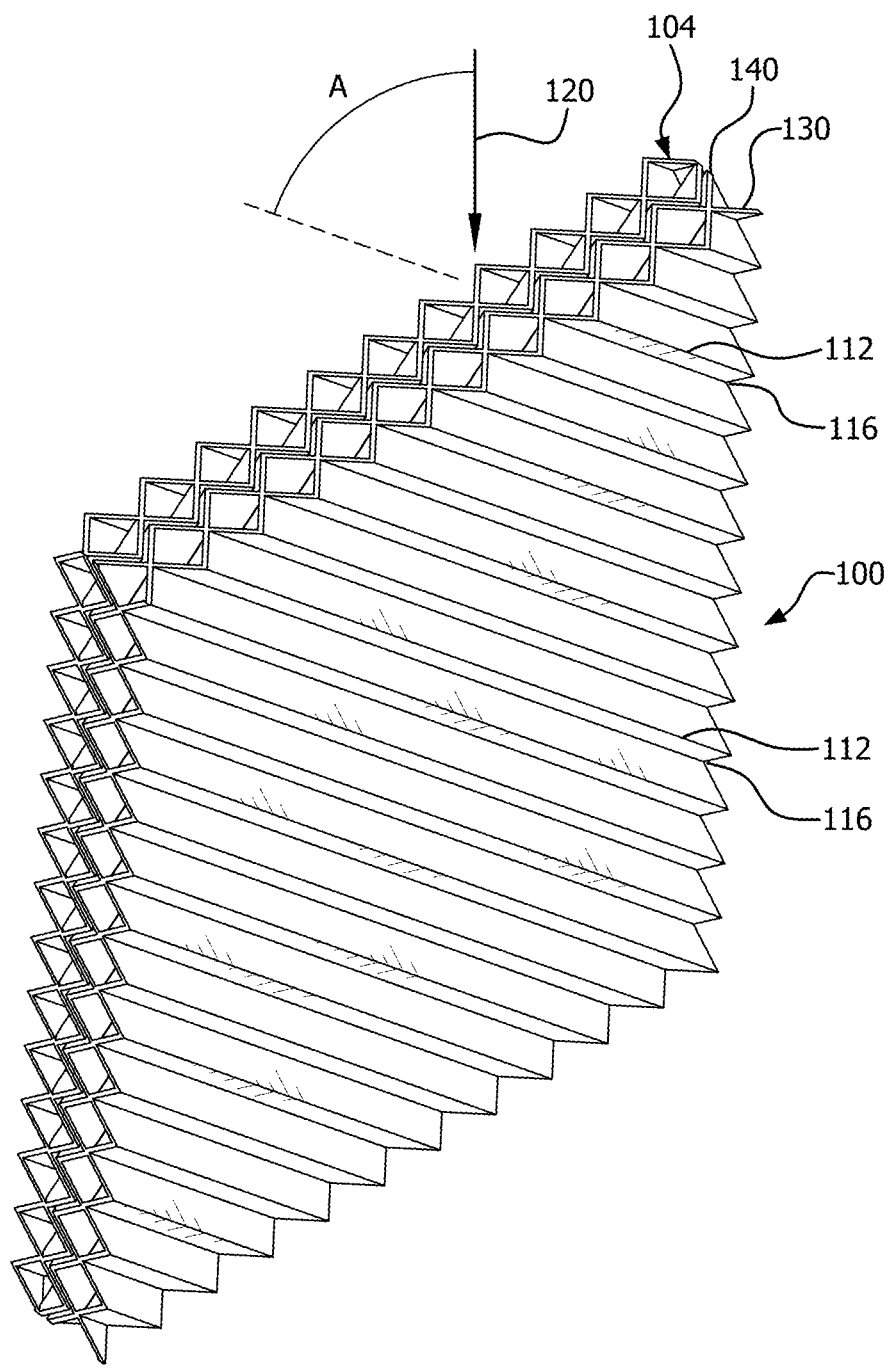
FIG. 7 is a right side perspective view of adjacent mass and heat transfer plates and an interior heat exchange fluid channel.
Figure 8:
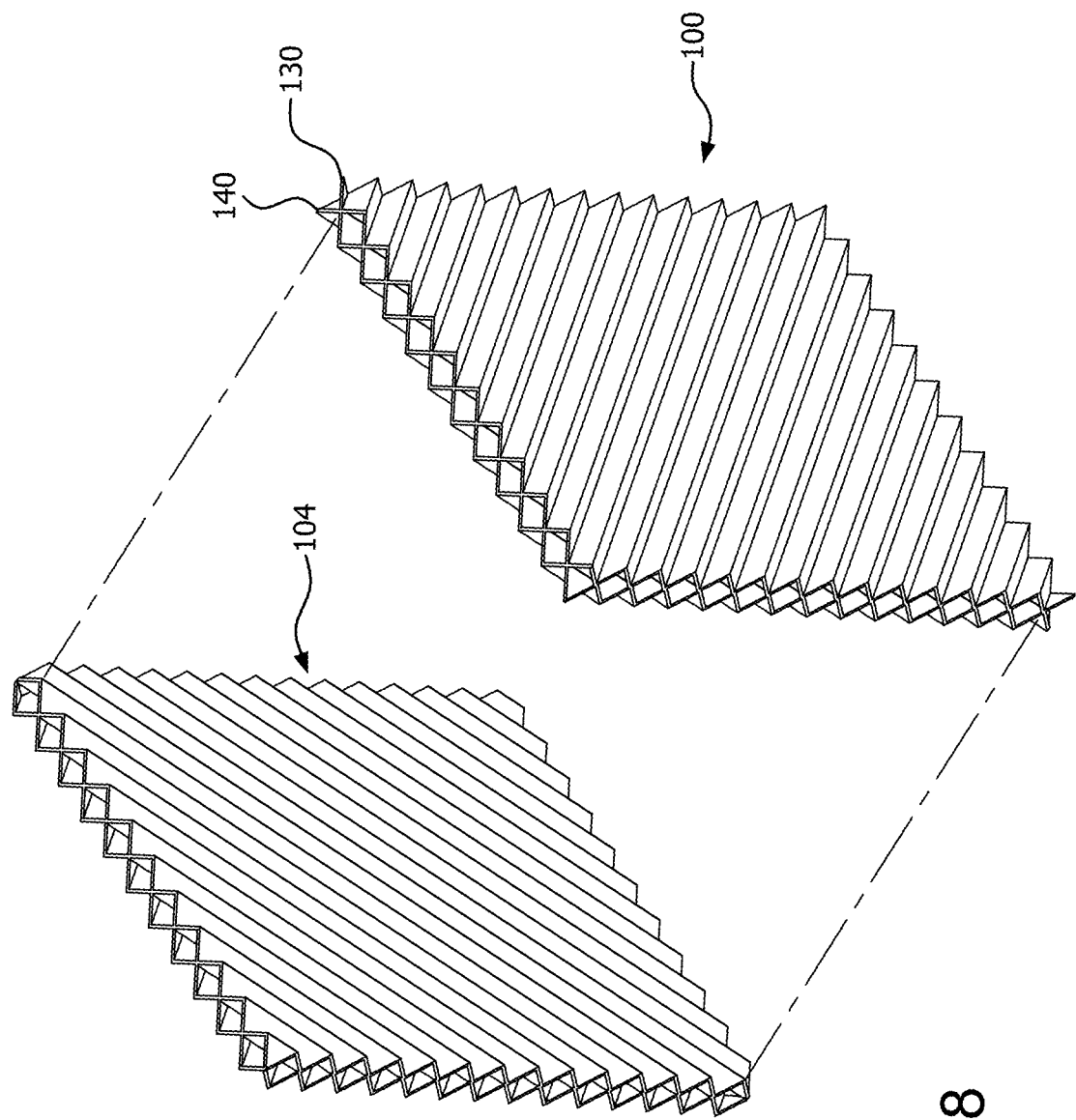
FIG. 8 is an exploded perspective view of adjacent mass and heat transfer plates.
Figure 9:
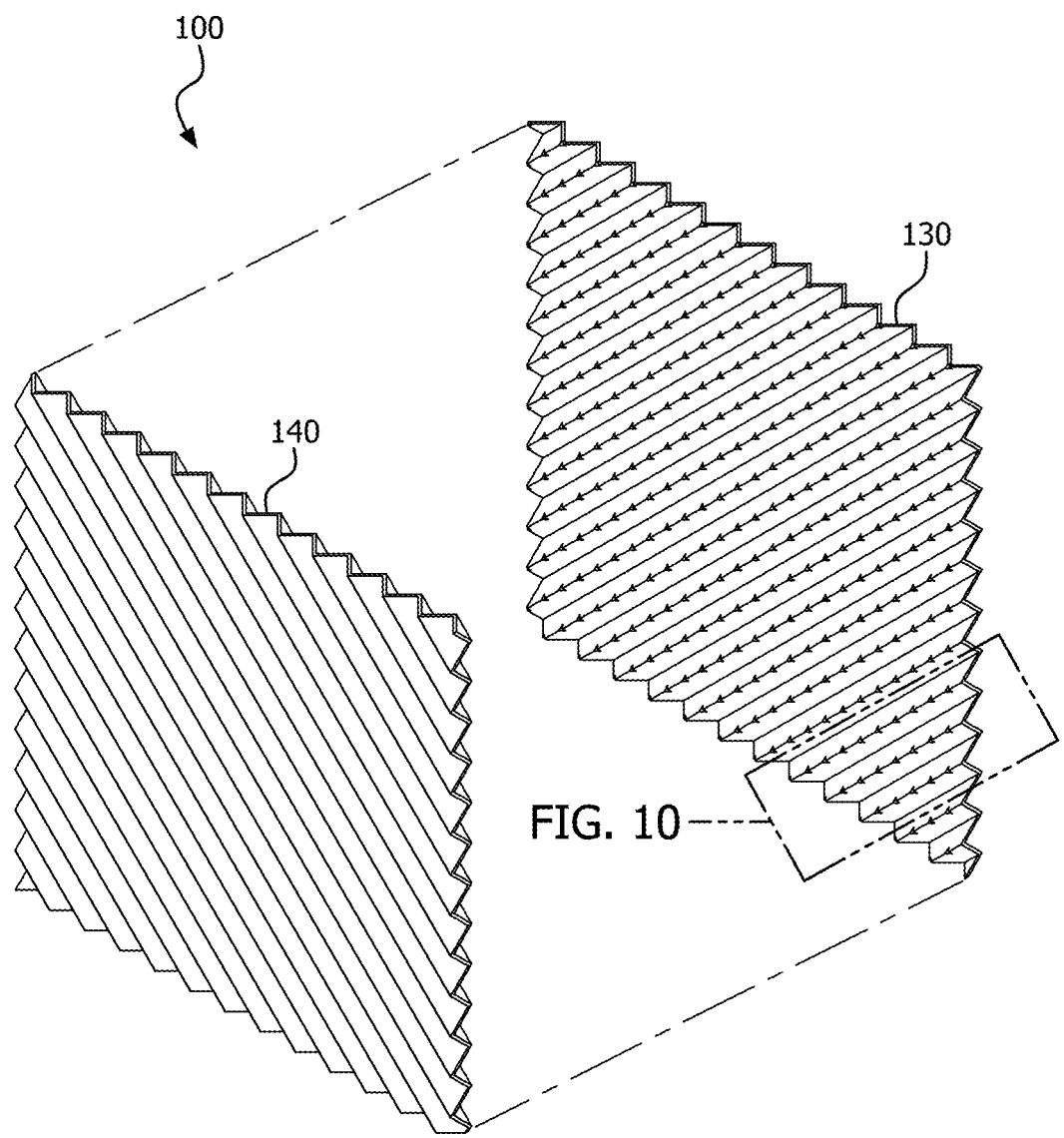
FIG. 9 is an exploded perspective view of adjacent mass and heat transfer plate side walls.
Figure 11:
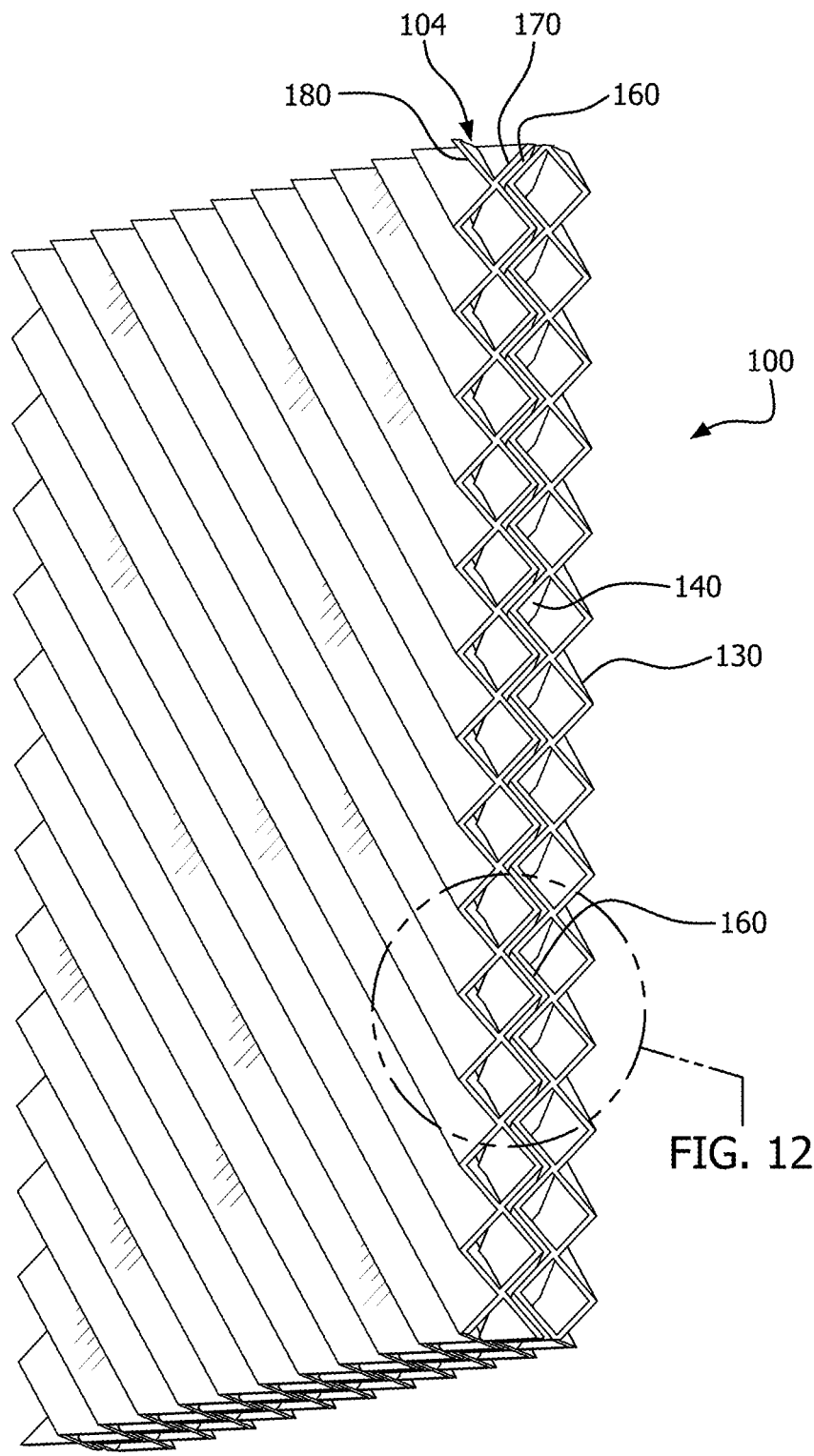
FIG. 11 is a left side perspective view of adjacent mass and heat transfer plates and a heat exchange fluid channel.
Figure 12:
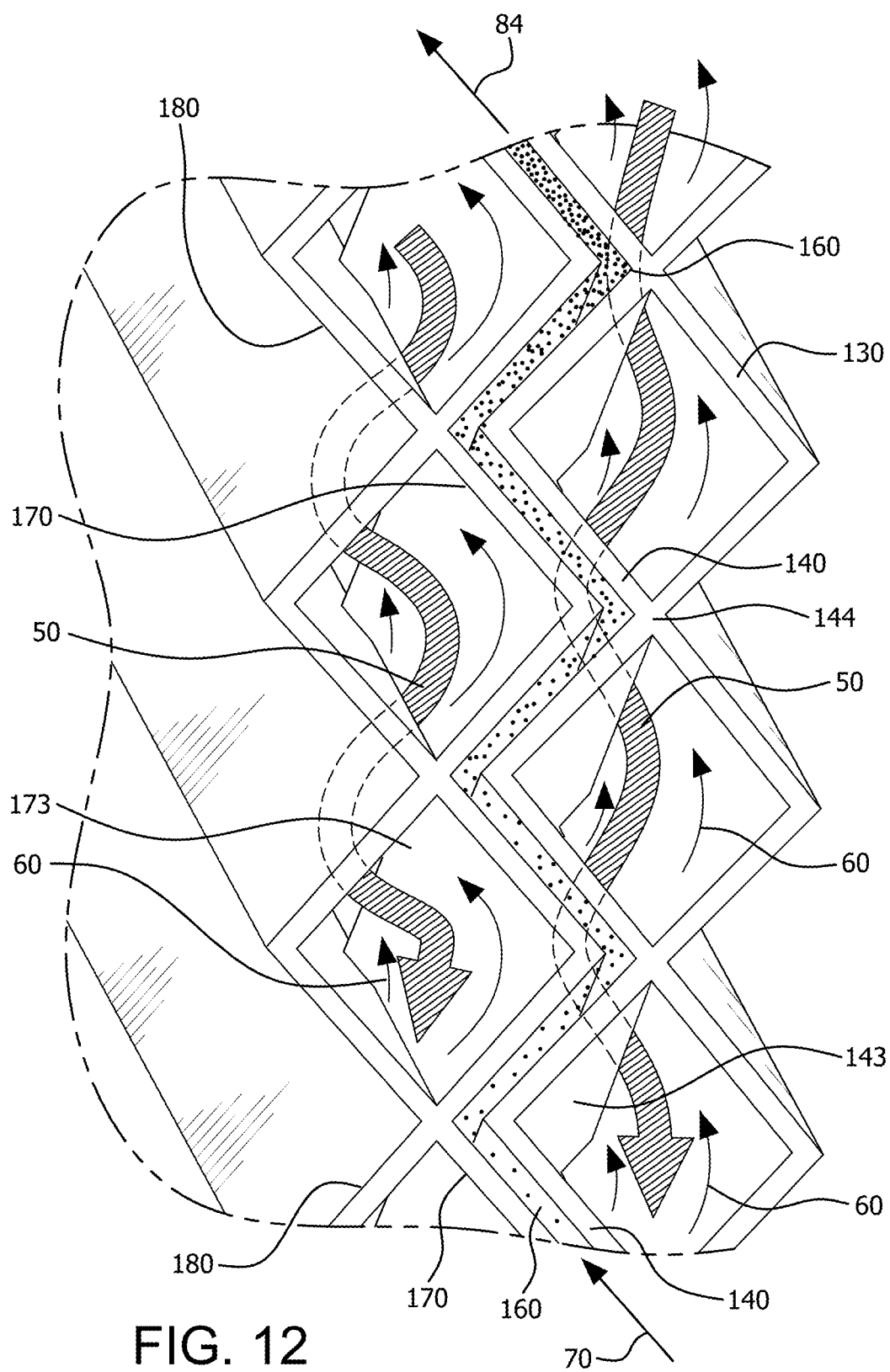
FIG. 12 is an enlargement of area FIG. 12 in FIG. 11.
Figure 13:
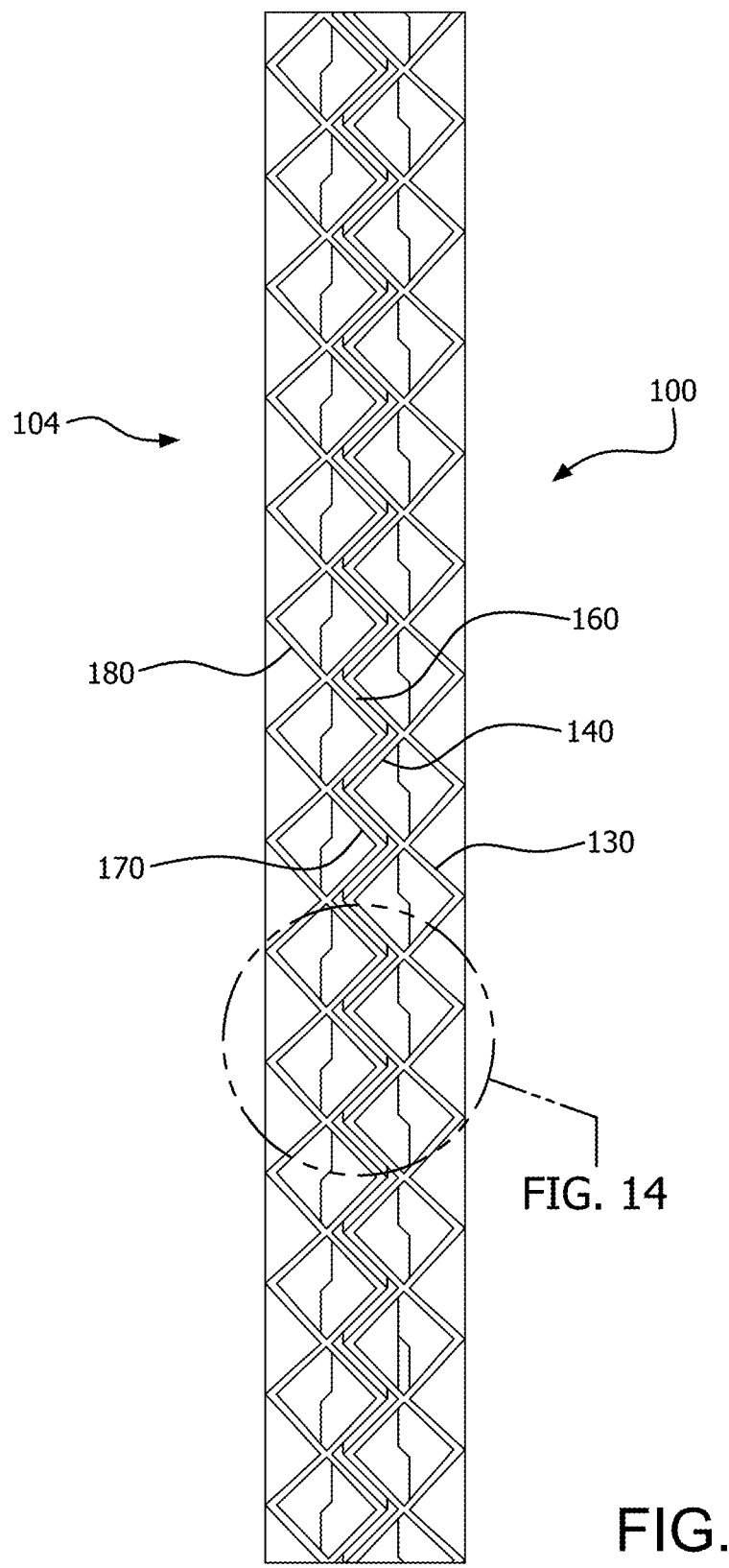
FIG. 13 is a front elevation of adjacent mass and heat transfer plates.

There is shown in FIGS. 6-8 exploded portions of the mass and heat transfer plate assembly 26 into subcomponents 100 and 104 to illustrate the three-dimensional configuration of the additively manufactured plate assembly 26. As used herein, the term mass and heat transfer plate means opposing mass and heat transfer sides enclosing and forming a heat exchange fluid channel. Each of the subassemblies 100 and 104 includes such a mass and heat transfer plate, and also portions of the mass and heat transfer sides of adjacent plates on either side of the mass and heat transfer plate. The subassembly 100 includes adjacent corrugated surfaces 130 and 140 and the subassembly 104 includes corrugated surfaces 170 and 180 (FIG. 11). The corrugated surfaces 130 and 140 are from adjacent mass and heat transfer plates. The corrugated surfaces 170 and 180 are also from adjacent mass and heat transfer plates. Corrugated mass and heat transfer sides 140 and 170 define a heat exchange fluid channel 160 and thereby a mass and heat transfer plate (FIGS. 11 and 12). The adjacent corrugations of adjacent mass and heat transfer plates making up each of the subassembly 100 and 104 define there between a flow path for the subject fluid and the mass and heat exchange fluid flowing through the plate assembly 26.

Figure 10:
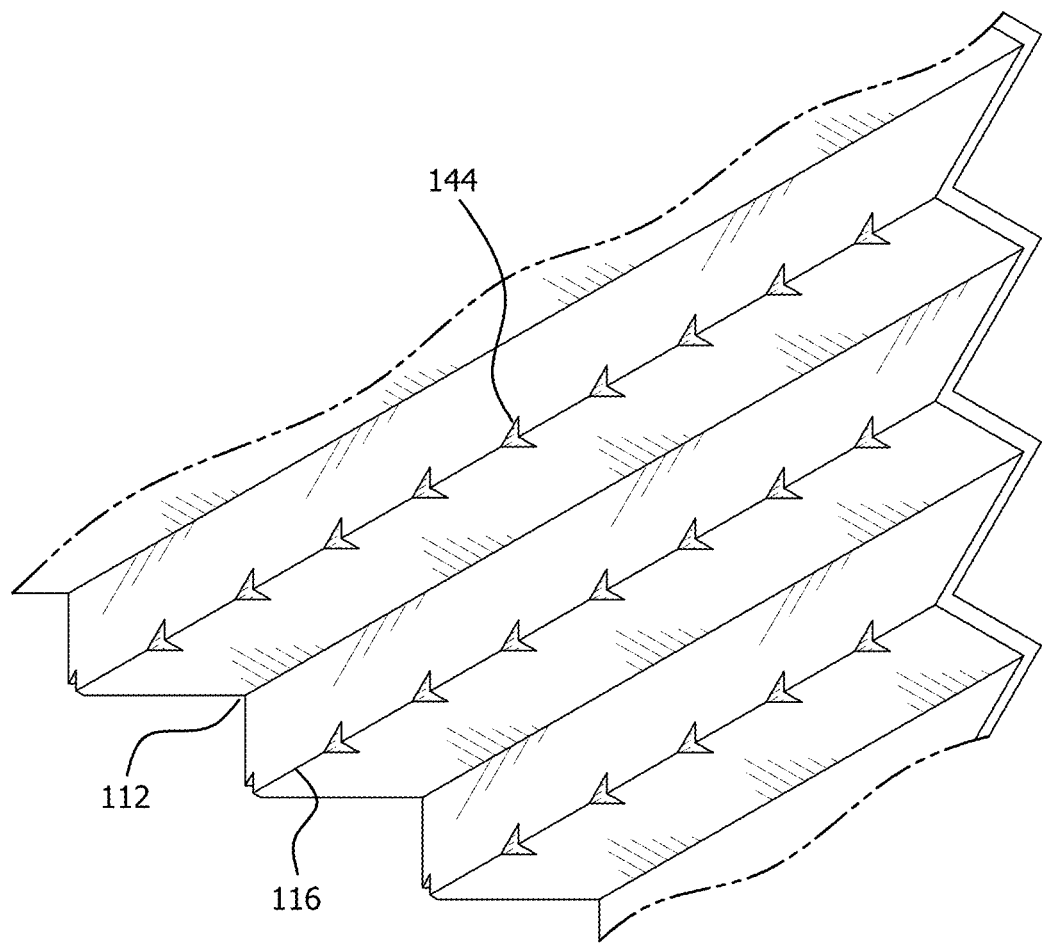
FIG. 10 is a perspective view of area FIG. 10 in FIG. 9.

The corrugations are made up of crests 112 and troughs 116 (FIG. 10). The purpose of the corrugations is to increase the surface area to facilitate mass and heat transfer between different phases, such as liquid and gas, and also to disrupt the flow path of the subject fluid and the mass and heat transfer fluid through the plate assembly 26. Other projecting structure can be used as an alternative to corrugations, for example projections that extend outwardly from the mass and heat transfer surfaces of the mass and heat transfer plates. Such projections can be in the form of baffle plates, geometrical shapes, and hemispherical shapes. Other structure for increasing the surface area of the mass and heat transfer surfaces and for promoting mixing of the subject fluid and the mass and heat transfer fluid is possible.

The corrugations can be at many different angles relative to the flow axis through the packing device. The corrugations can be offset from the flow axis (in the illustration a vertical) indicated by arrow 120 (FIG. 7), as by an angle A, at an acute angle to promote mixing and increase the time the fluid spends in the column while also facilitating flow through the plate assembly 26. The corrugations of adjacent plates are also angled in an offset, however, the corrugations of adjacent plates can be different so as to create a tortuous flow path through the packing device. The angle of the corrugations of adjacent plates can for example be 30° to 150°, or up to a 180° offset from one another. Other offsets are possible. Through the additive manufacturing process adjacent plates need not be completely separate, but can have interconnecting portions or joints between plates at some locations. As shown in FIG. 10, adjacent mass and heat transfer sides of adjacent mass and heat transfer plates can be joined or interconnected through the additive manufacturing process, as by joined or interconnecting portions 144. This will provide additional structural rigidity.

Figure 14:
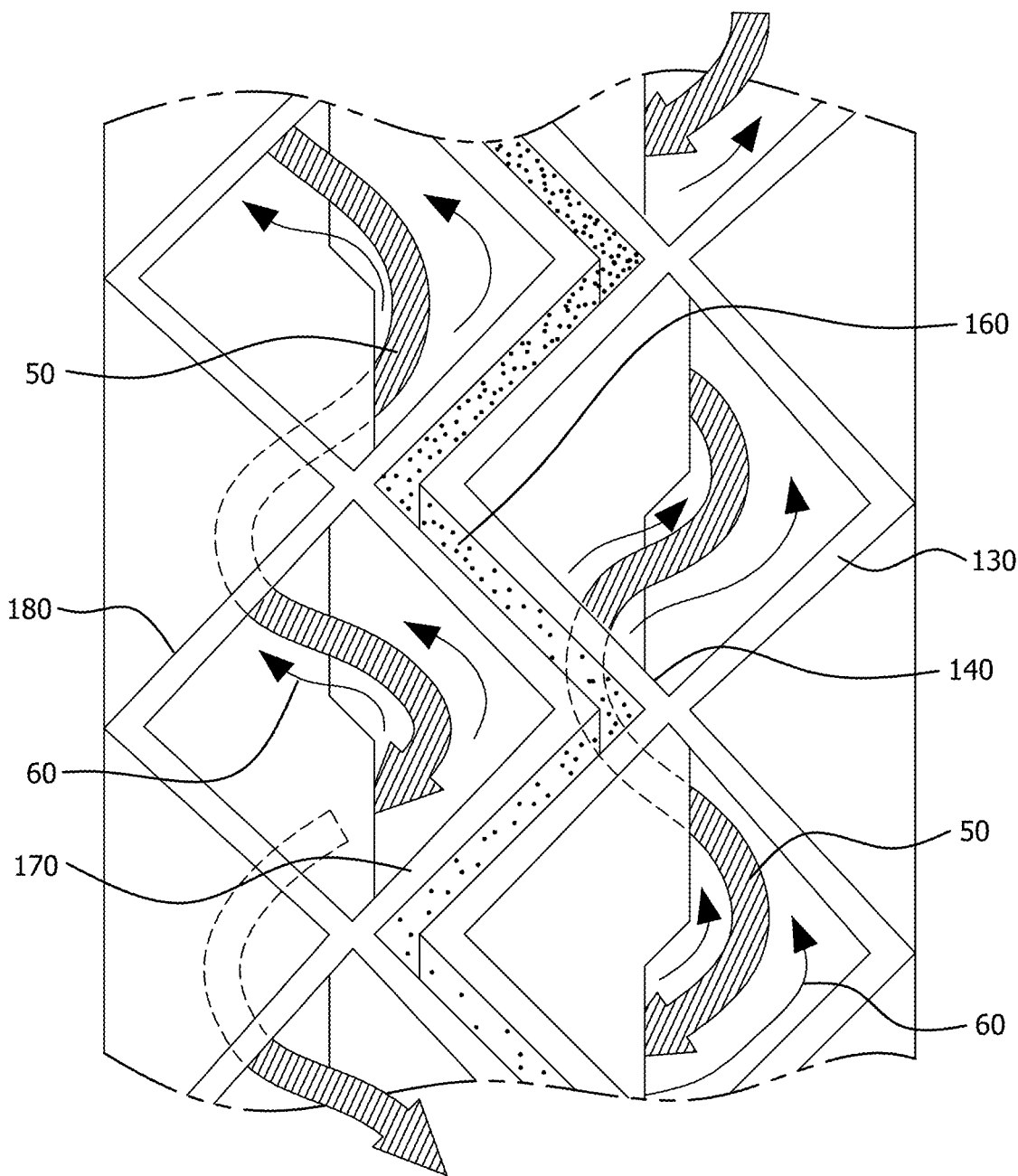
FIG. 14 is an enlargement of area FIG. 14 in FIG. 13.

The operation of the mass and heat transfer plates is particularly shown in FIGS. 12 and 14. A mass and heat transfer plate is shown with mass and heat transfer sides 140 and 170 enclosing and defining a heat exchange fluid channel 160. Mass and heat transfer side 140 includes mass and heat transfer surface 143 and the mass and heat transfer side 170 includes mass and heat transfer surface 173. The inlet heat exchange fluid stream 70 enters and travels through the heat exchange fluid channel 160 and gains (or releases) heat as indicated by increasing stippling until exiting as heat exchange fluid outlet stream 84 (FIG. 12). The subject fluid 60 travels in the flow path space between the adjacent mass and heat transfer sides 130 of the plate, and the mass and heat transfer side 140 of an adjacent mass and heat transfer plate. The subject fluid 60 also travels in the flow path space between the adjacent mass and heat transfer sides 170 of the plate, and the mass and heat transfer side 180 of an adjacent mass and heat transfer plate. The mass and heat transfer fluid 50 flows countercurrent to the subject fluid flow 60. The target component will be removed from the subject fluid 60 and will be removed by the mass and heat transfer fluid 50. Heat given off or consumed by the process will be transferred to the flowing heat exchange fluid 70 flowing through the heat exchange fluid channel 160, and will flow out as an exit stream 84 having a temperature that is different from that of the entering heat exchange fluid stream 70.

Figure 15:
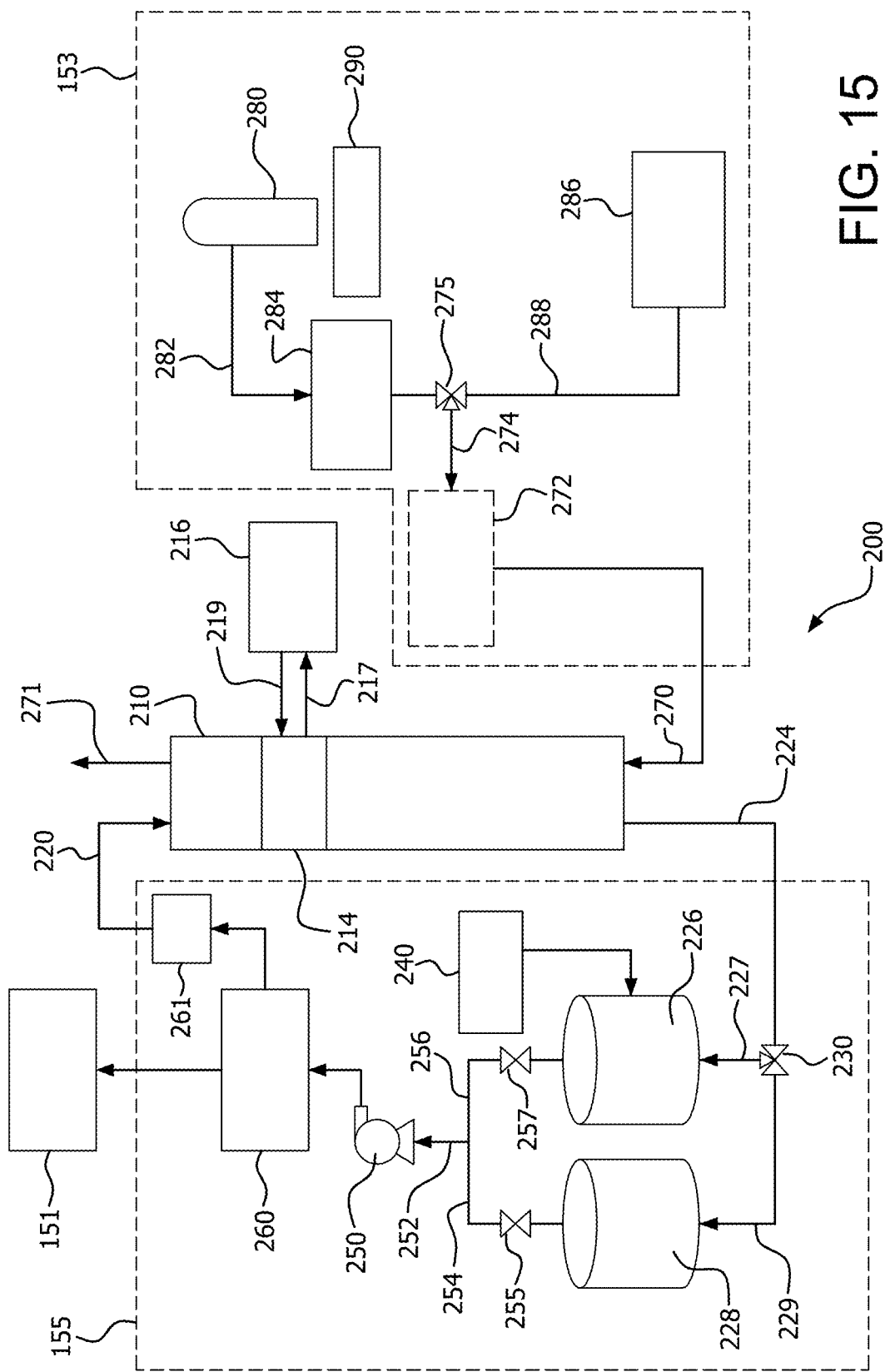
FIG. 15 is a schematic diagram of a system for conducting mass and heat transfer with a subject fluid.

There is shown in FIG. 15 a system 200 for conducting mass and heat transfer with a subject fluid. The system includes a separation column 210 having a packing device 214 according to the invention. Heat exchange fluid is supplied from a source 216 and has a heat exchange fluid inlet conduit 217 to direct fluid into the source 216 and a heat fluid outlet conduit 219 to direct fluid out of the source 216. The source if desired can include a heat exchange unit, or the heat exchange fluid can be replenished and exhausted on a continuous basis, for example to and/or from an industrial process that generates heated or cooled water.

The heat and mass transfer fluid enters the top of the column 210 through a mass and heat transfer fluid conduit 220 and exits the 210 through a heat and mass transfer fluid outlet conduit 224. The heat and mass transfer fluid can be a liquid and can be stored in storage container 226 receiving the heat and mass transfer fluid through a heat and mass transfer fluid inlet conduit 227, and optionally an additional storage container 228 which receives fluid through a heat and mass transfer fluid inlet conduit 229. Flow out of the column 210 and into the storage container 226 and 228 can be controlled by one or more valves 230. Flow out of the storage containers 226 and 228 can be provided through a suitable outlet line 254 and controlled by a valve 255, and outlet line 256 controlled by the valve 257, which can connect to a mass and heat transfer fluid flow conduit 252. A pump 250 directs the mass and heat transfer fluid to an optional heater and controller unit 260 which then directs the mass and heat transfer fluid to the mass and heat transfer inlet conduit 220. The heater unit 260 can be used to regenerate the heat and mass transfer fluid, for example by heating MEA to cause the release of $CO_2$ which can be routed to a suitable $CO_2$ storage or outlet 151. A heat exchanger 261 can be used to reduce the temperature of the stream flowing through conduit 220 to a desired value.

The subject fluid can enter the column through a subject fluid inlet conduit 270 and can exit the column 210 through a subject fluid outlet conduit 271. An optional heater/cooler and controller 272 can be provided for the subject fluid depending on process parameters. The subject fluid is received from a subject fluid inlet conduit 274 which communicates with a control valve 275. A subject fluid source 280 can be a container or a conduit, for example a conduit connecting with the exhaust of an industrial process exhaust gas stream. The subject fluid sourced 280 communicates with a subject fluid conduit 282 which can communicate with a mass controller 284 and then the valve 275. A blower 286 can also be provided and communicate with the valve 275 through a blower conduit 288 to add another gas such as air to control the concentration of $CO_2$ entering the column. The system 200 can be controlled by a suitable processor 290, which can control process parameters and apparatus through suitable wired and/or wireless connections.

The system 200 that is depicted in FIG. 15 can vary, and varying components and processes are possible for use in conjunction with the column 210. The input of subject fluid to the column 210 can be generalized as indicated by area 153. The output of the subject fluid can be generalized as indicated by area 155. For example, in processes where industrial waste gases of known and relatively constant concentration are treated the blower 286 and blower conduit 288 may not be necessary. Also, the subject fluid in some processes can be input at the top or somewhere between the top or bottom of the column 210, rather than at the bottom as shown, and the location of the input and output of a second fluid can also be changed.

Figure 16:
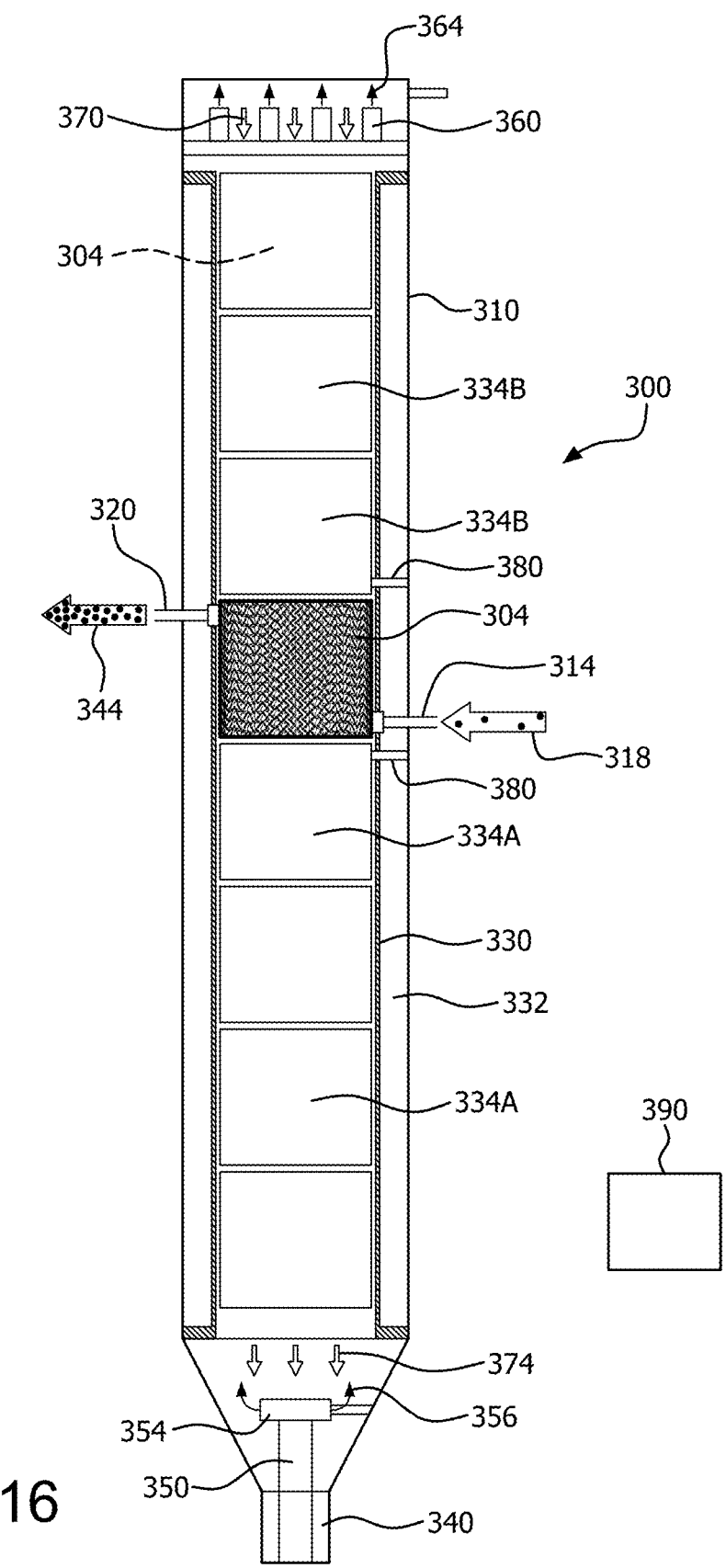
FIG. 16 is a schematic diagram of a column for conducting mass and heat transfer with a subject fluid.

The invention can be used in different process equipment such as the separation column 300 shown in FIG. 16. The column 300 includes a packing device 304 according to the invention within a housing 310. The packing device 304 receives heat exchange fluid through an inlet 314 and a heat exchange fluid source indicated generally by arrow 318. The heat exchange fluid travels through the mass and heat exchange plates of the packing device 304 as previously described. Fluids traversing the column pass through the packing device 304 between the mass and heat transfer plates and exchange heat with the plates and ultimately the heat exchange fluid flowing through the plates.

The housing 310 can be of typical design being elongated and tubular. Other designs are possible. The housing 310 can have an inner tubular shell 330 for containing prior art packing of various kinds as well as the packing device 304 and providing an insulating space 332 with the outside of the column 300. The prior art packing can be random packing or structured packing. Structured packing 334 is shown, such as the Sulzer 250 Y packing element. The structured packing 334A can be positioned adjacent and below the packing device 304 of the invention, and structured packing 334B can be positioned adjacent and above the packing device 304. Additional packing device units according to the invention can be provided elsewhere and throughout the column, such as the packing device 304 indicated by dashed lines at the top of the column 300. The packing device 304 can be a single unit, or multiple units and can be combined with other types of packing or the entire column 300 can be fitted with one or multiple packing devices 304 according to the invention with no additional packing. Other designs are possible.

The column 300 can have a liquid outlet 340 positioned at the bottom of the column 300. The column 300 can receive a subject fluid such as gas containing $CO_2$ through a gas inlet 350 which disperses the gas through a gas dispersion head 354 into multiple gas streams 356. Gas exits the top of the column through ports 360 as an exit gas stream 364. Liquid 370 enters at the top of the column 300 and traverses the column to contact the gas in countercurrent flow and exits through the liquid outlet 340 as an exit stream 374 with the target compound. The liquid 370 can be selected to remove a target component such as $CO_2$ from the gas. The liquid and the gas exchange heat with the plates of packing device 304 and ultimately the heat exchange fluid flowing through the plates. The heat exchange fluid exits the packing device 304 through a heat exchange fluid outlet 320 as a heated (or cooled) exit stream 344. The exiting heat exchange fluid can be removed from the process, or can undergo further heat exchange to return the temperature of the heat exchange fluid to near its original temperature and the heat exchange fluid can be returned to the heat exchange fluid inlet 314. One or more process sensors such as thermocouples 380 can be provided. The process can be monitored by a suitable processor 390 which can control process parameters and apparatus by means of suitable wired or wireless connections.

Figure 17:
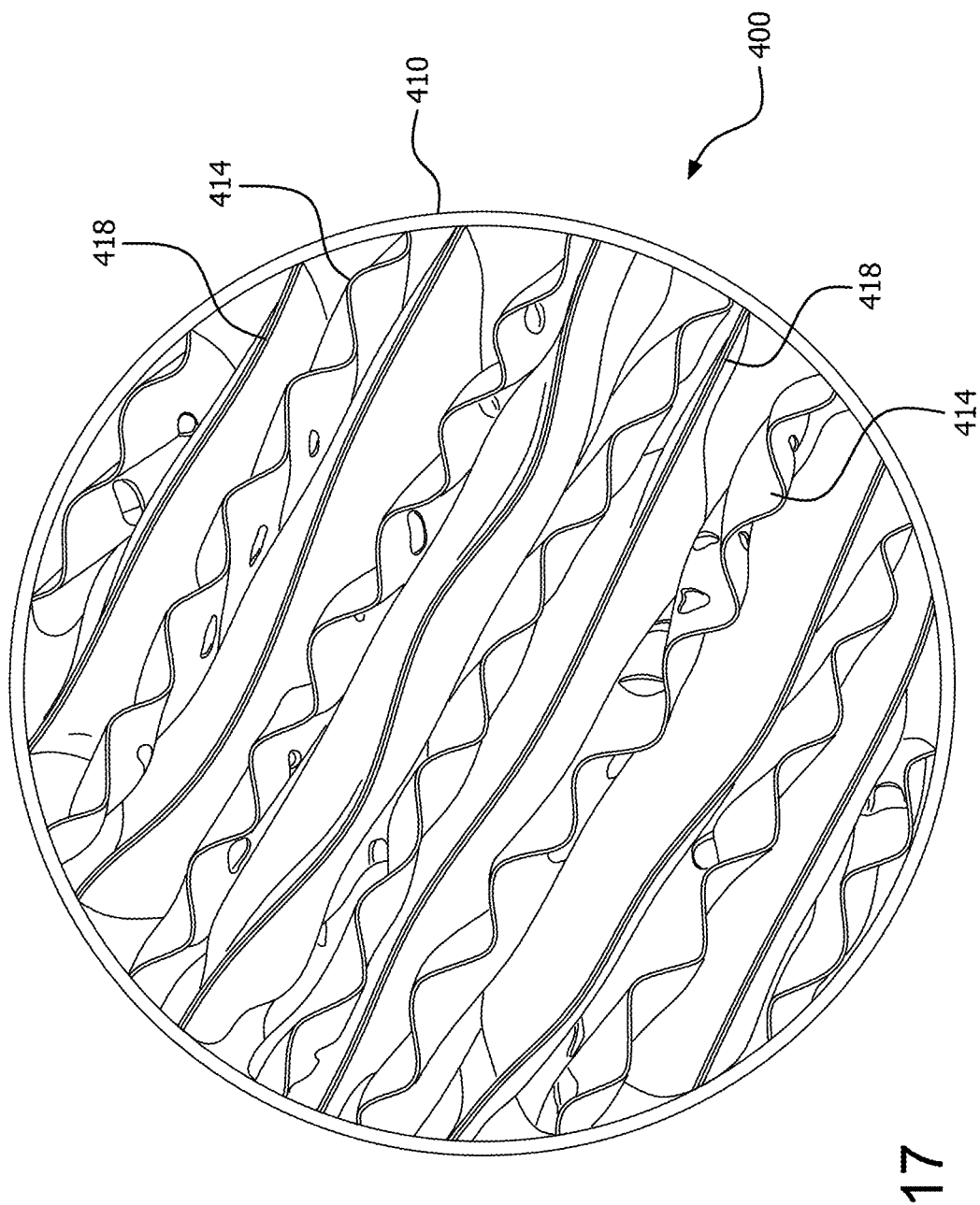
FIG. 17 is a plan view of an alternative embodiment of a packing device for conducting mass and heat transfer with a subject fluid.
Figure 18A:
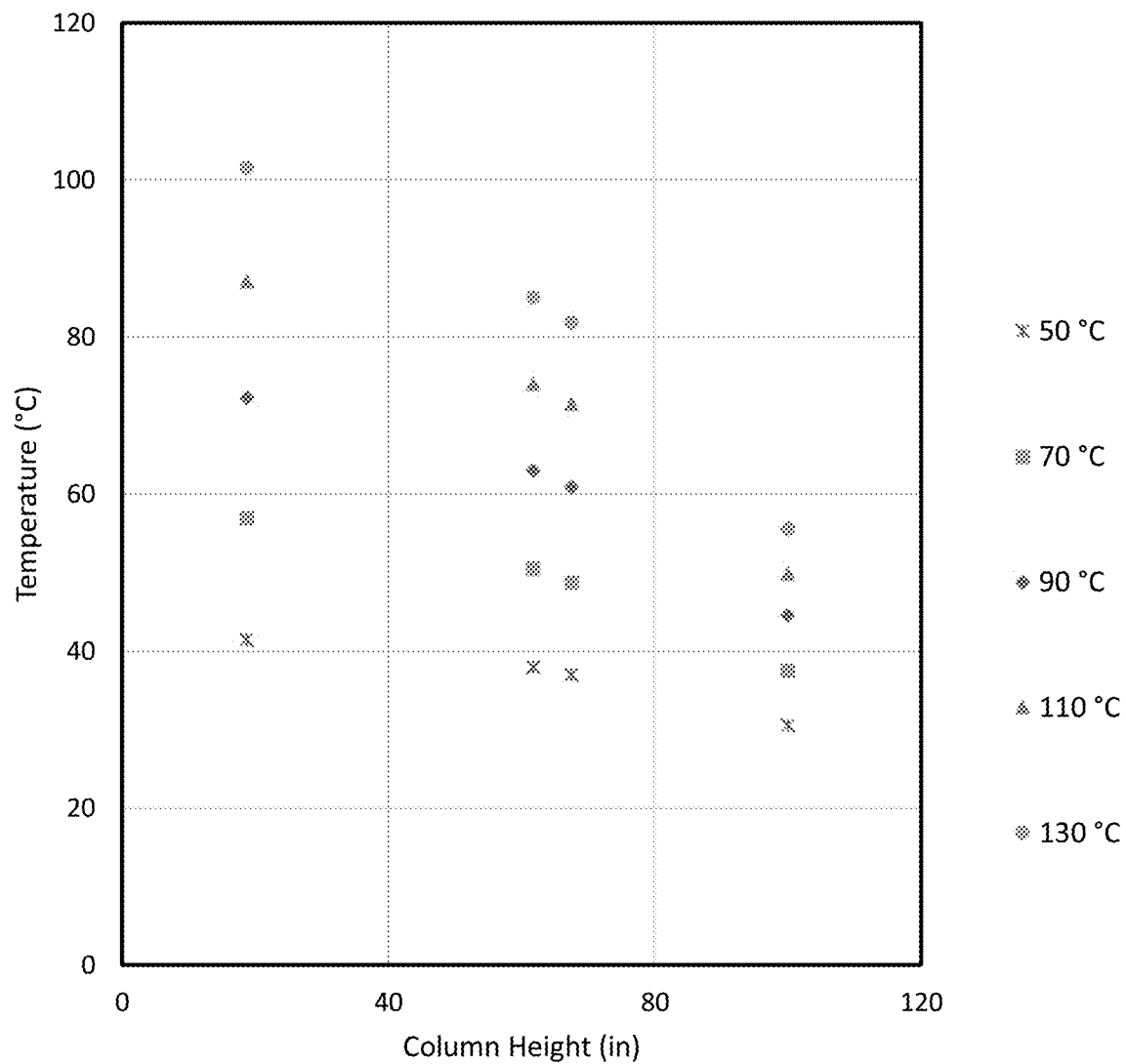
FIGS. 18A-18B show temperature profiles inside a column at various input gas temperatures for a gas flow rate of 650 liters per minute (LPM).
Figure 18B:
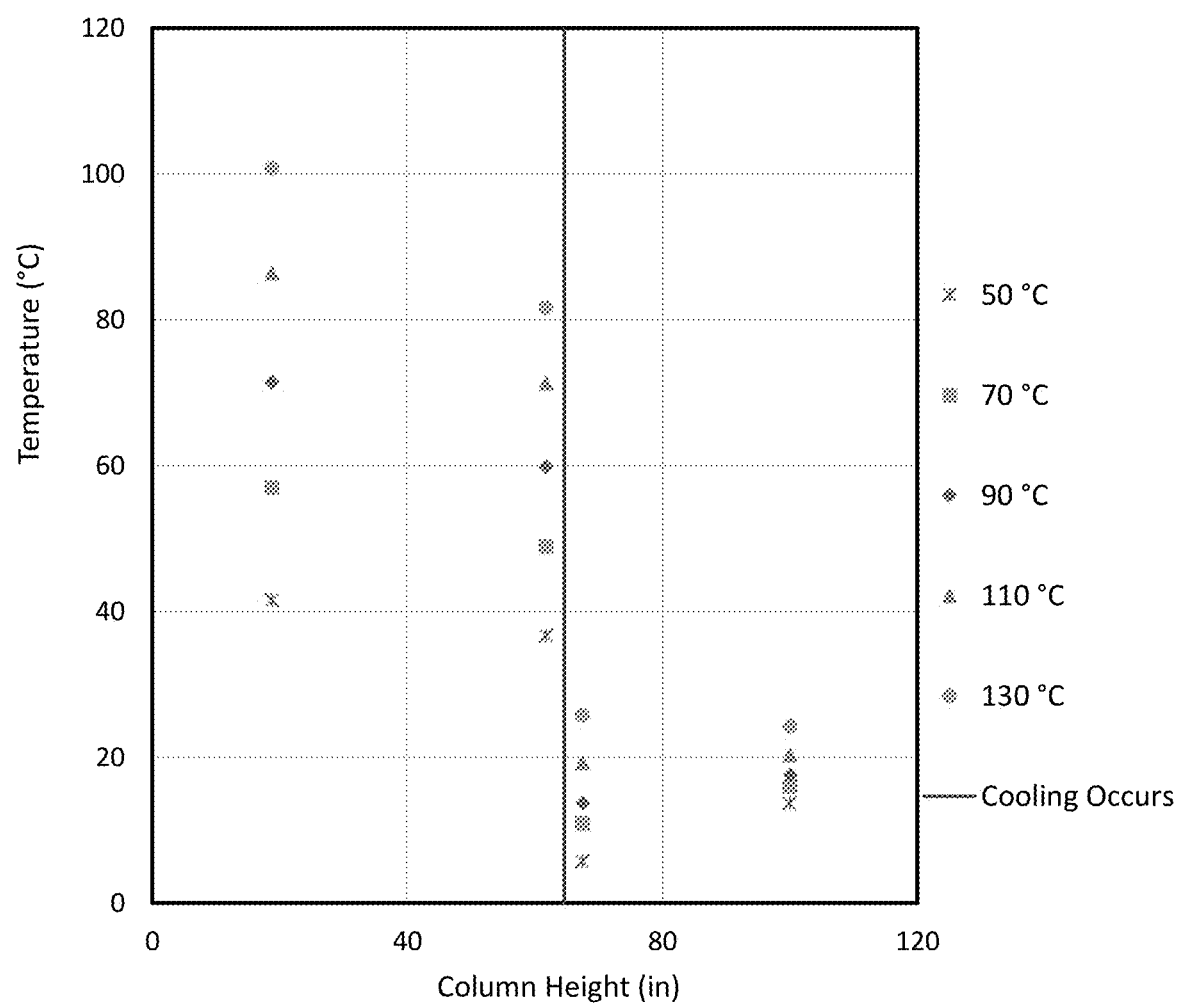

The invention is capable of taking different forms. There is shown in FIG. 17 a packing device 400 having a housing 410. Heat and mass transfer plates 414 are provided in the housing 410. The heat and mass transfer plates 414 have interior heat exchange fluid channels (not shown), and can have corrugations as previously described. The packing device 400 also includes non-corrugated plates 418 alternating with the corrugated heat and mass transfer plates 414. The non-corrugated plates 418 can have interior heat exchange fluid channels or can be without interior heat exchange fluid channels.

EXAMPLE

A packing device according to the invention was manufactured at Oak Ridge National Laboratory's Manufacturing Demonstration Facility. Corrugated sheets were modeled in Solidworks and bundled together. The angle of corrugation can be altered, but for this experiment it was set to 45°. A cylindrical cut was then made on the stack of corrugated sheets. Previous studies have evaluated the hydrodynamic characteristics of 3D printed plastic packing elements of Mellapack geometry in comparison to those of metal and plastic commercial packing elements. It was found that 3D printed plastic packing elements had a pressure drop that compared favorably to both metal and plastic commercial packing elements; however, the wettability compared poorly to the metal commercial packing element which suggests selecting a more hydrophilic material would improve the performance of the device. For that reason, aluminum was chosen as the printing material in this study, as well as because of its high thermal conductivity.

Internal coolant channels were subsequently added to the design of the device. The coolant fluid first flows around the perimeter of the device, then enters spaces within the corrugated plates. Inside those spaces, the coolant channels run parallel to the corrugation angle, so that coolant flows counter-currently with the solvent, and co-currently with the gas. The inlet and outlet for the coolant were placed on the bottom and top of the device, respectively.

The testing facility for the packing device was a scaled down model of an absorption column which can measure as much as 80 m in height and 20 m in diameter. The absorption column used to simulate plant-scale conditions was a 1-m tall, 8-in diameter column. At this scale, the residence time of the reactants is too short to allow sufficient heat to accumulate in the column, so cooling would have negligible benefits. To adequately simulate the properties of flue gas, fluids were delivered to the column at controlled temperatures using a thermostatically controlled Tutco Farnam Heat Torch 150 inline air heater for gas, and a thermostatically controlled Eemax Lavadvantage tankless water heater for solvent.

The column consisted of seven Mellapak 250 Y, 8-in diameter commercial packing elements acquired from Sulzer, and a packing device according to the invention. The commercial packing elements are stacked on top of each other, with the packing device of the invention placed in the middle. This location was chosen because simulations using the MFIX multiphase computational fluid dynamics software showed that this location would be where the largest accumulation of heat would be found, thus, cooling would yield the most noticeable results. For the purpose of testing heat transfer through the packing device, air was delivered to the column from the bottom using a stainless-steel pipe in the shape of a T, with the air coming out of the sides of the pipe, to prevent water from entering the air lines. Water was pumped to the top of the column where it entered a liquid distribution system composed of a tray, punctuated with small holes of ⅛-inch diameter for water flow, and two plastic pipes for air to escape.

Pressure drop across the packing device was measured for both dry and irrigated systems using a handheld digital barometer. Gas flow was introduced to the system using a blower that allowed the flow rate to be controlled. Once the pressure reading stabilized, ten measurements were taken in 10 second intervals, and the average value was recorded. Liquid flow was then introduced into the system using a pump at 6 different flow rates, and pressure drop was measured as described. Wettability measurements were taken by submerging the device in water, then removing it, and determining the mass of water retained after 1) initial mild shaking, 2) further shaking, 3) additional shaking and drying of external surface, 4) and further shaking and drying of external surface. The mass of water retained was determined by subtracting the weight.

The temperature of each fluid inside the column was measured in situ by type K thermocouples installed at four separate locations: at the very bottom of the column, immediately under the intensified device, immediately above the intensified device, and at the very top of the column. Data recording software automatically recorded the temperature at each measurement site to generate a transient profile of the site. The temperature of the air and water at each site was also recorded after the system reached steady state conditions for comparison of measurements with and without cooling.

The temperature profile of the column was first studied using only air delivered to the system by a gas blower at 520 LPM, 650 LPM, and 780 LPM. The temperature of the input air was varied between 50° C. and 130° C. in intervals of 20° C. Every set of conditions was repeated twice, once without cooling and once with cooling, and the resulting temperature profiles were contrasted with each other.

For the gas only experiments, the coolant was supplied by a 1345-W cooler manufactured by Thermo Fisher Scientific. Water was used as the coolant. The temperature set point of the coolant was set to 5° C. and the flow rate was held constant at 1.33 LPM.

Water was subsequently added to the system to study the behavior of the temperature profile in an irrigated system. The temperature profile of the absorption column was recorded at input air flow rate of 650 LPM and 520 LPM and input water flow rates of 1.36 LPM, 1.81 LPM, and 2.26 LPM. The temperature of the input air was 80° C., and the water delivered to the system was heated to 40° C., 60° C., and 80° C. The flow and temperature conditions for each experiment are tabulated in Table 1.

TABLE 1

Flow and temperature conditions for irrigated experiments

| Case | Air Flow Rate (LPM) | Air Temperature (° C.) | Water Flow Rate (LPM) | Water Temperature (° C.) |
|---|---|---|---|---|
| 1 | 650 | 80 | 1.36 | 80 |
| 2 | 650 | 80 | 1.81 | 80 |
| 3 | 650 | 80 | 2.26 | 80 |
| 4 | 650 | 80 | 2.26 | 60 |
| 5 | 650 | 80 | 2.26 | 40 |
| 6 | 520 | 80 | 2.26 | 80 |

Due to power limitations, irrigated system experiments were conducted using a larger, 5 Ton chiller. The coolant was a 10% propylene glycol solution by volume. The chiller supplied a constant flow rate of 1.96 LPM. The temperature was set to 9° C. The temperature of the coolant at the inlet and outlet of the intensified device were recorded using flow through temperature sensors connected to a handheld data logger.

The heat transfer rate of a fluid can be calculated using the measured flow rates, and measured temperatures at the inlet and outlet of the system using equation (1):

$$q = \dot{m} c_p \Delta T \tag{1}$$

where q is the heat transfer rate (W), $\dot{m}$ is the mass flow rate of the fluid (kg/s), $c_p$ is the specific heat capacity for water, and $\Delta T$ is the change in temperature between the inlet and outlet (° C.). The specific heat capacity and density of water used to calculate the mass flow rate are taken from water property tables at the average temperature between the inlet and outlet.

The overall heat transfer coefficient, U, can be determined using the Log Mean Temperature Difference method if the heat transfer rate is known using the equation:

$$U = \frac{q}{A \Delta T_{lm}} \tag{2}$$

where A is the contact surface area (m²) and $\Delta T_{lm}$ is the log mean temperature difference (° C.), given by:

$$\Delta T_{lm} = \frac{\Delta T_2 - \Delta T_1}{\ln\left(\frac{\Delta T_2}{\Delta T_1}\right)} \tag{3}$$

Here, $\Delta T_1$ and $\Delta T_2$ are temperature differentials that depend on operating conditions. In the packing device, the water is considered to flow co-currently with the coolant inside the device. Under co-current flow, temperature differentials are given by the following equations:

$$\Delta T_2 = T_{h,i} - T_{c,i}$$

$$\Delta T_1 = T_{h,o} - T_{c,o} \tag{4}$$

which give the difference in temperature between the hot and cold fluid at the inlet and outlet.

The Log Mean Temperature Difference Method has several limitations. It can only be performed on two-phase systems, which excludes three-phase systems like an absorption column; therefore, one of the phases has to be neglected in the calculations. The heat transfer of the air was neglected in this case because of its much lower specific heat. Moreover, the method also assumes an adiabatic system, which does not hold for the absorption column as a substantial heat loss was observed even without cooling. The calculated heat transfer coefficient is therefore a combination of ambient cooling and cooling from the intensified device and should be considered a first order approximation.

MFIX is an open source multiphase flow modeling tool developed at the National Energy Technology Laboratory (NETL), and the MFIX-TFM (Two-Fluid Model) is an Eulerian-Eulerian model which supports a broad range of capabilities for dense, reacting, multiphase flows by representing the fluid and solids as interpenetrating continua. The MFIX model of solvent absorption, a custom extension of the MFIX-TFM model that models liquid and gas two phase flow has been used in the current effort for validation purposes for the irrigated system experiments. In this gas-liquid MFIX-TFM, the coupling of hydrodynamics for countercurrent gas-liquid flow through a packed column, chemical reactions, and heat and mass transfer specific to $CO_2$ absorption using MEA have been modeled. In applying this gas-liquid MFIX-TFM, the model parameters were chosen so that the two-phase pressure drop, liquid holdup, wetting efficiency, and mass transfer efficiency as a function of operating conditions were either matching with the experiment data or existing literature reports. The cooling from the coolant flow in the intensified device was modeled as heat transfer with a fixed temperature coolant at a constant heat-transfer coefficient in the section where the intensified device is located. In addition, a uniform heat transfer coefficient along the column height was applied to model the heat loss to the ambient air for this column with less than an ideal insulation. In this example, the gas flow does not include any $CO_2$ and thus no chemical reaction is involved.

A sample comparison of temperature profiles for the dry system is shown without cooling (FIG. 18A) and with cooling (FIG. 18B) at 650 LPMx. A significant drop in temperature was exhibited by the system without cooling due to heat losses to the environment, with higher heat losses being observed for higher input air temperatures, as high as 100° C. for input air at 130° C. Nevertheless, the addition of cooling drastically reduced the temperature of the column above the intensified device, with a post cooling temperature reduction as high as 81.5% for 520 LPM. The post-cooling temperature reduction, defined as change from $T_2$ to $T_3$, for other gas flow rates is shown in Table 2. The substantial difference in the temperature profile after cooling demonstrates the ability of the intensified device to act as a heat exchanger.

TABLE 2

Change in temperature of air flowing through intensified device for different flow rate conditions at input temperature of 130° C.

| Flow Rate (LPM) | T2 (° C.) | T3 (° C.) | ΔT (° C.) |
|---|---|---|---|
| 520 | 75.81 | 14.11 | 61.7 |
| 650 | 81.65 | 25.68 | 55.97 |
| 780 | 86.19 | 37.94 | 48.25 |

Figure 19:
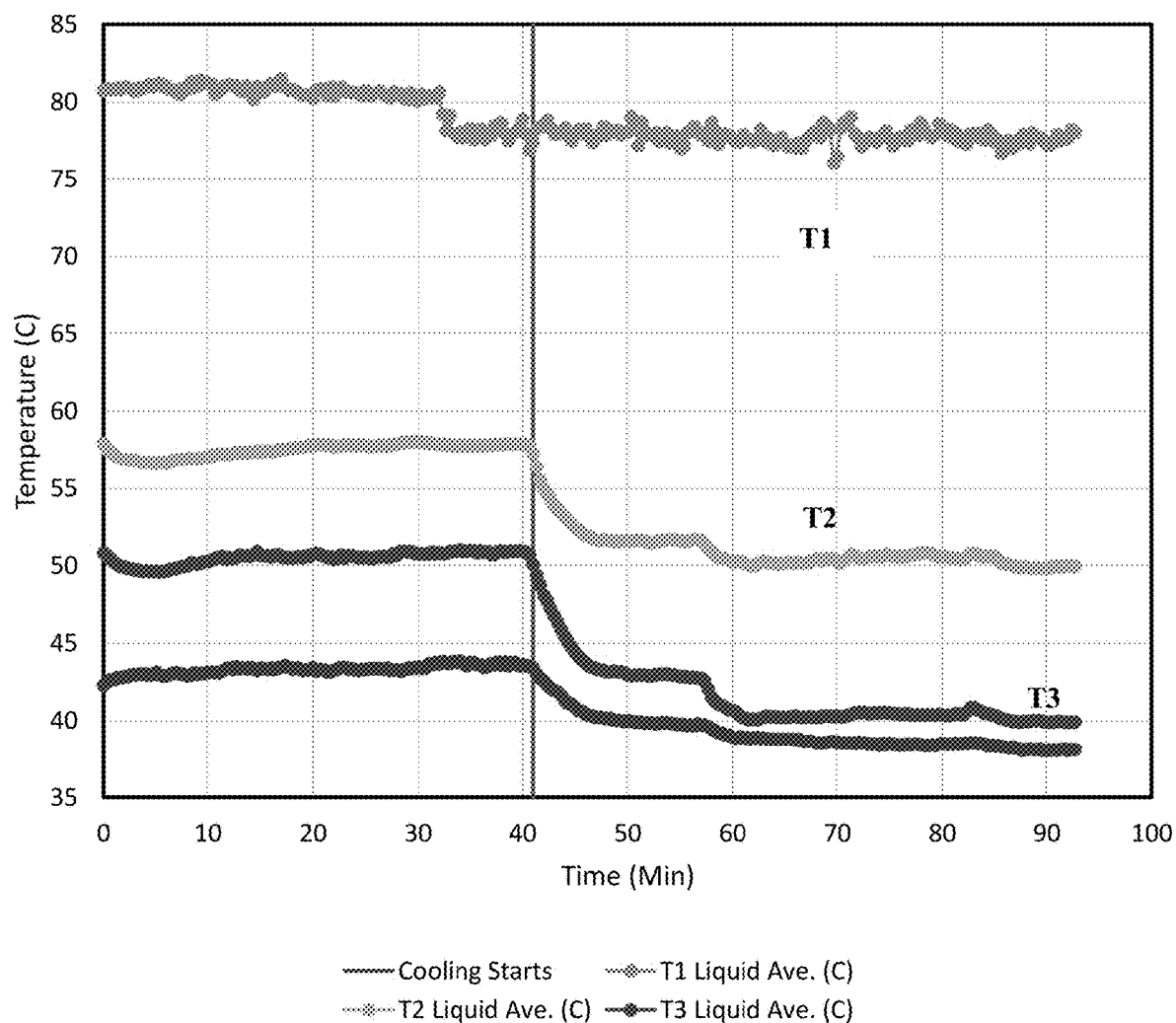
FIG. 19 shows the transient temperature profile of the system before and after cooling. Cooling was turned on at 40 minutes.

A sample transient profile of the liquid temperatures for the irrigated system is shown in FIG. 19. The input air flow rate was 650 LPM and its temperature was 80° C., while the water flow rate was 1.81 LPM and it was heated to 80° C. The coolant fluid was cooled to 9° C., however, it was measured to be 19° C. at the inlet of the intensified device. The moment that cooling was activated is demarcated on the temperature profile by a vertical line. The impact of cooling in this case is less drastic than for air, which is expected on account of the much higher heat capacity of the heated water. Nevertheless, a significant reduction in temperature post-cooling was observed. The temperature at $T_3$ was reduced by 11° C. The temperature at $T_2$ was reduced by 8° C., despite this location being above the intensified device.

Figure 20A:
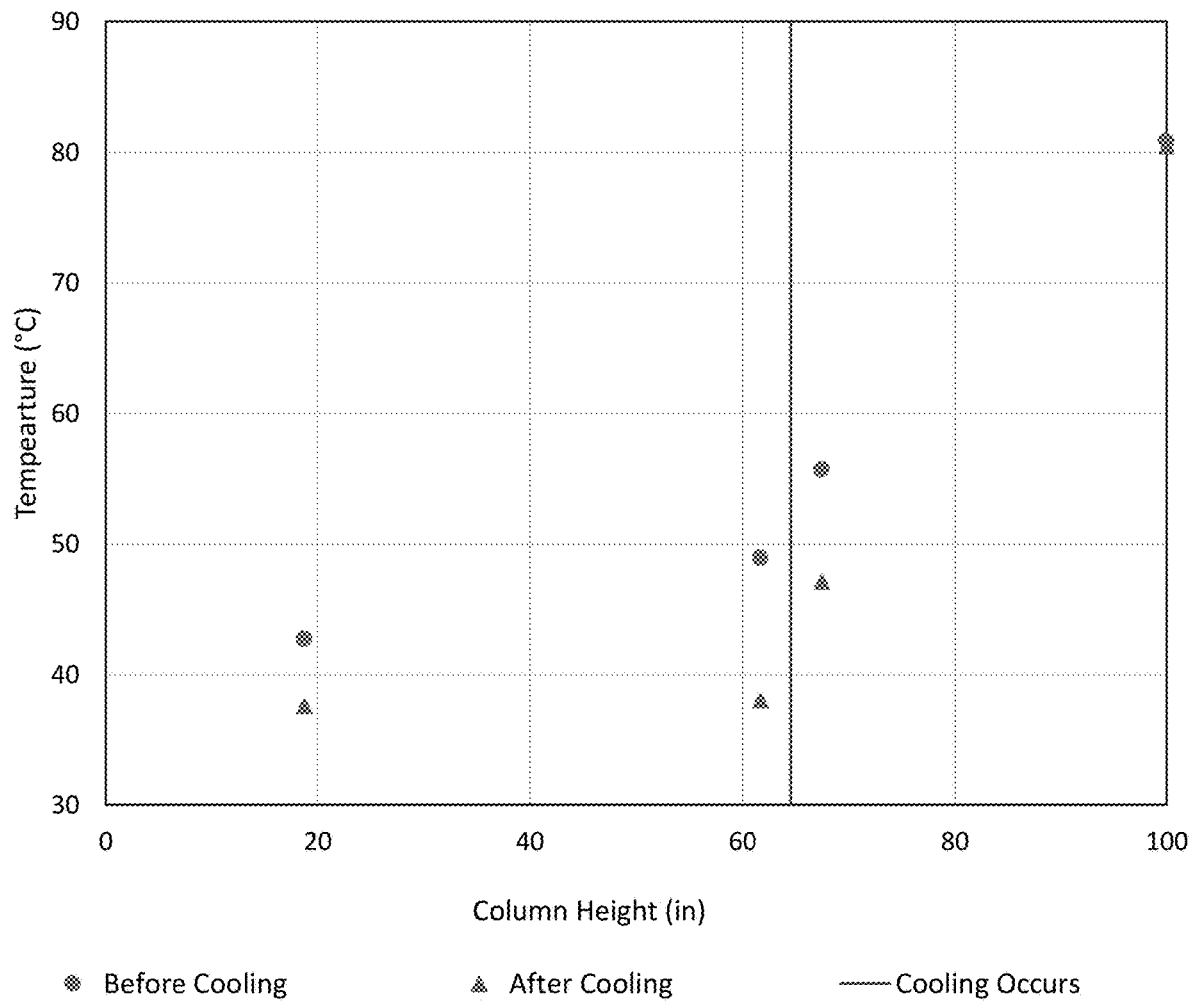
FIGS. 20A-20C show a comparison of the water temperature profile in the air/water system before and after cooling. Input air was at 650 LPM and 80° C. Input water was at 80° C. Input water is flowing at FIG. 20A—1.36 LPM.
Figure 20B:
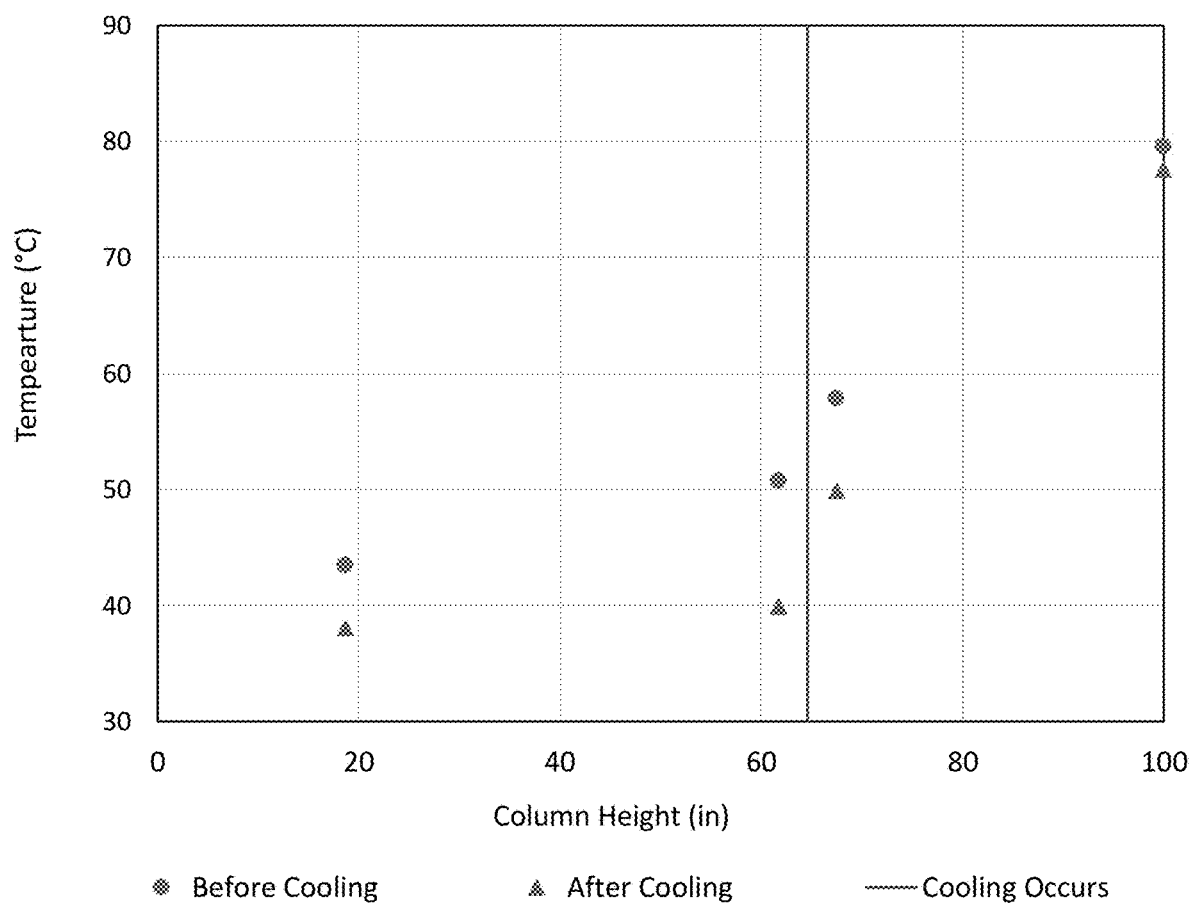
Figure 20C:
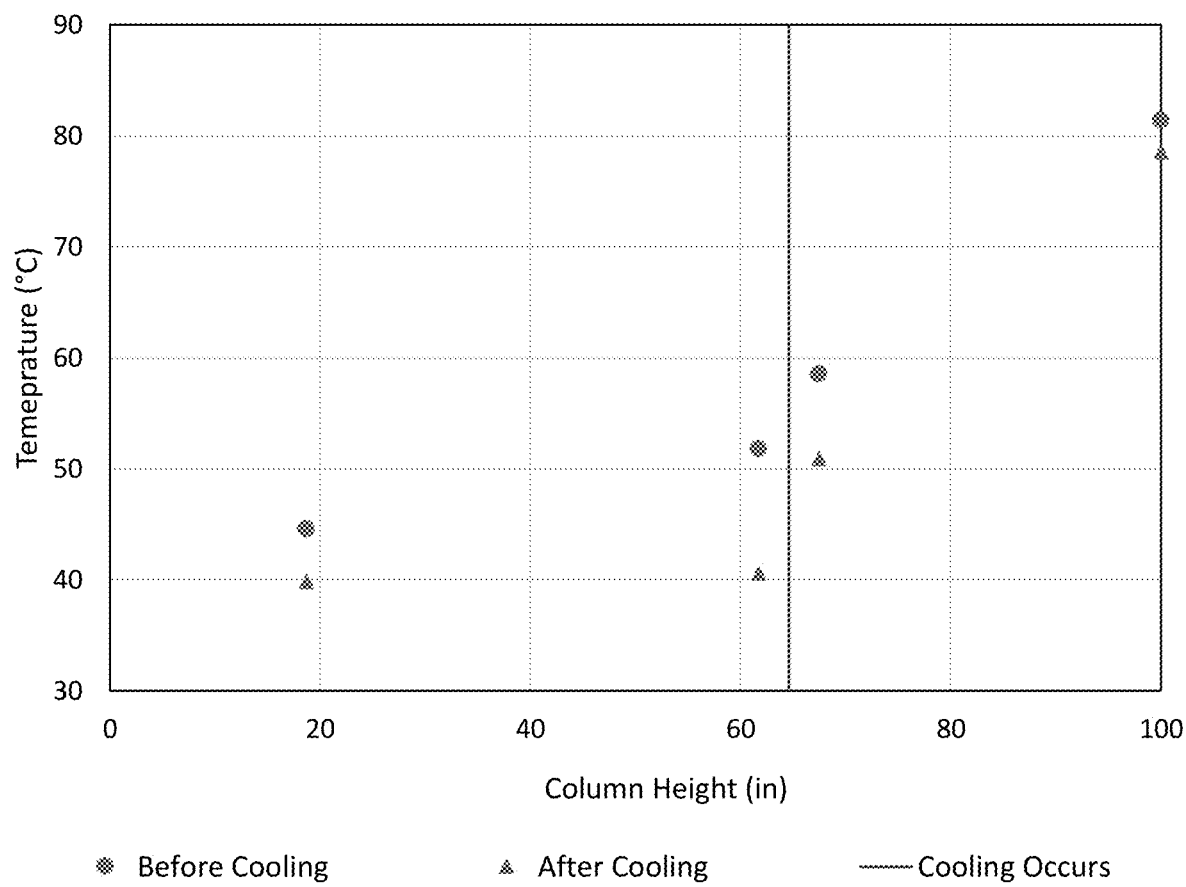

The geometric temperature profile of the water inside the column was determined and is presented in FIGS. 20A-C for three different water flow rates. FIGS. 20A-20C show a comparison of the water temperature profile in the air/water system before and after cooling. Input air was at 650 LPM and 80° C. Input water was at 80° C. Input water is flowing in FIG. 20A at 1.36 LPM, in FIG. 20B at 1.81 LPM, and in FIG. 20C at 2.26 LPM. The temperature profile of the gas closely followed that of the water, likely due to both phases being in intimate contact, so only the liquid temperature is shown. This result demonstrates that with appropriately sized cooling equipment, the packing device of the invention can have strong heat-exchange capabilities. The results, however, also reveal that the water is losing large amounts of heat even prior to the cooling, which limits the ability of the experiments to demonstrate the benefit of cooling. There are two likely explanations for this behavior. One is heat losses to ambient, and the other is vaporization of the liquid phase into the gas because of the low humidity air being pumped into the column, which would remove heat from the liquid and reduce the temperature of the system. Despite this limitation, these results demonstrate that the intensified device is a viable heat-exchange device when water is added to the system.

The overall heat transfer coefficient at various experimental conditions is presented in Table 3. Overall, the calculated values exhibit very good agreement with each other and only vary between 32.5 and 34.9 W/° C.-m². The consistency in the results indicates a well behaving system. Changes in flow rate had a very small effect on the overall heat transfer coefficient, which could be a consequence of the small variation in flow rate—an interval of only 0.45 LPM between each flow rate.

TABLE 3

Heat transfer coefficient for various flow and temperature

| Air Flow Rate (LPM) | Air Temperature (° C.) | Water Flow Rate (LPM) | Water Temperature (° C.) | Heat Transfer Coefficient (W/K-m2) |
|---|---|---|---|---|
| 650 | 80 | 1.36 | 80 | 34.7 |
| 650 | 80 | 1.81 | 80 | 34.7 |
| 650 | 80 | 2.26 | 80 | 32.8 |
| 650 | 80 | 2.26 | 60 | 32.8 |
| 650 | 80 | 2.26 | 40 | 32.5 |
| 520 | 80 | 2.26 | 80 | 34.9 |

Figure 21:
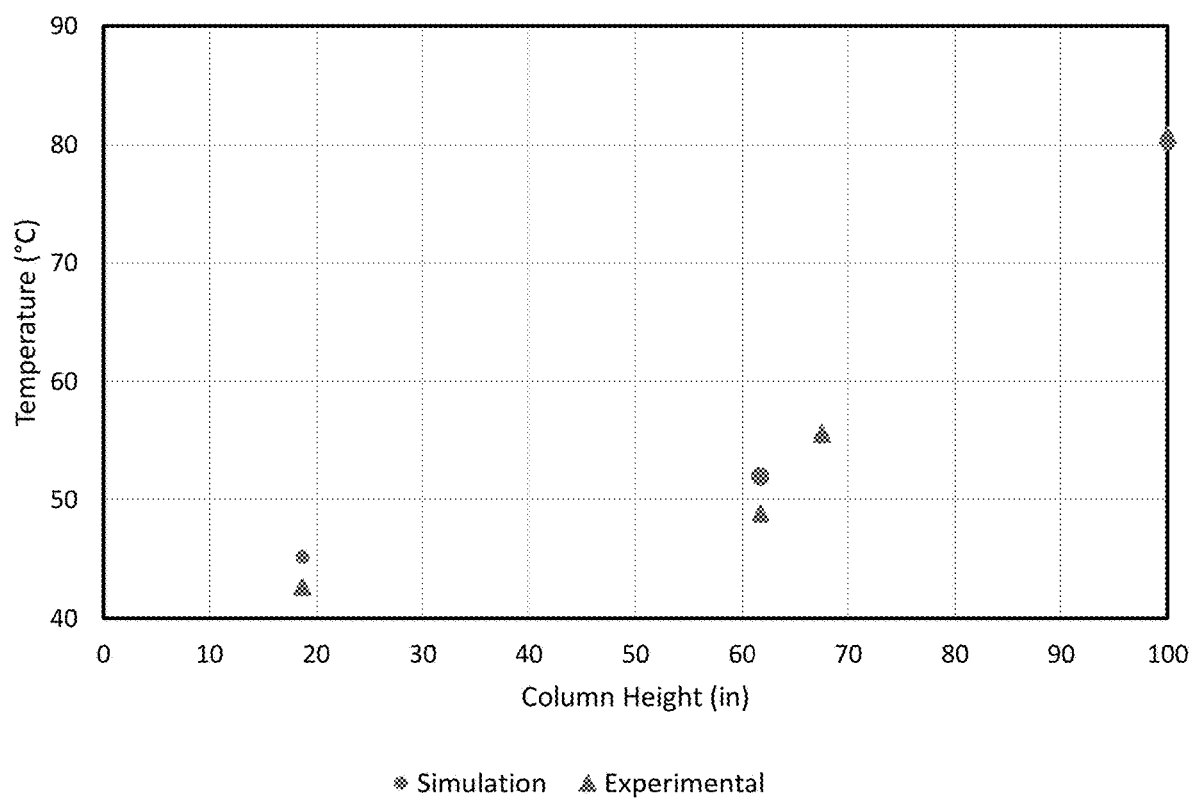
FIG. 21 shows a comparison of uncooled liquid temperature profile between an MFIX simulation and experimental results.

The experimental heat transfer results were compared to temperature profiles predicted by MFIX at the same temperature and flow conditions. A comparison of the experimental and simulation temperature profiles for selected conditions without cooling is shown in FIG. 21.

Figure 22:
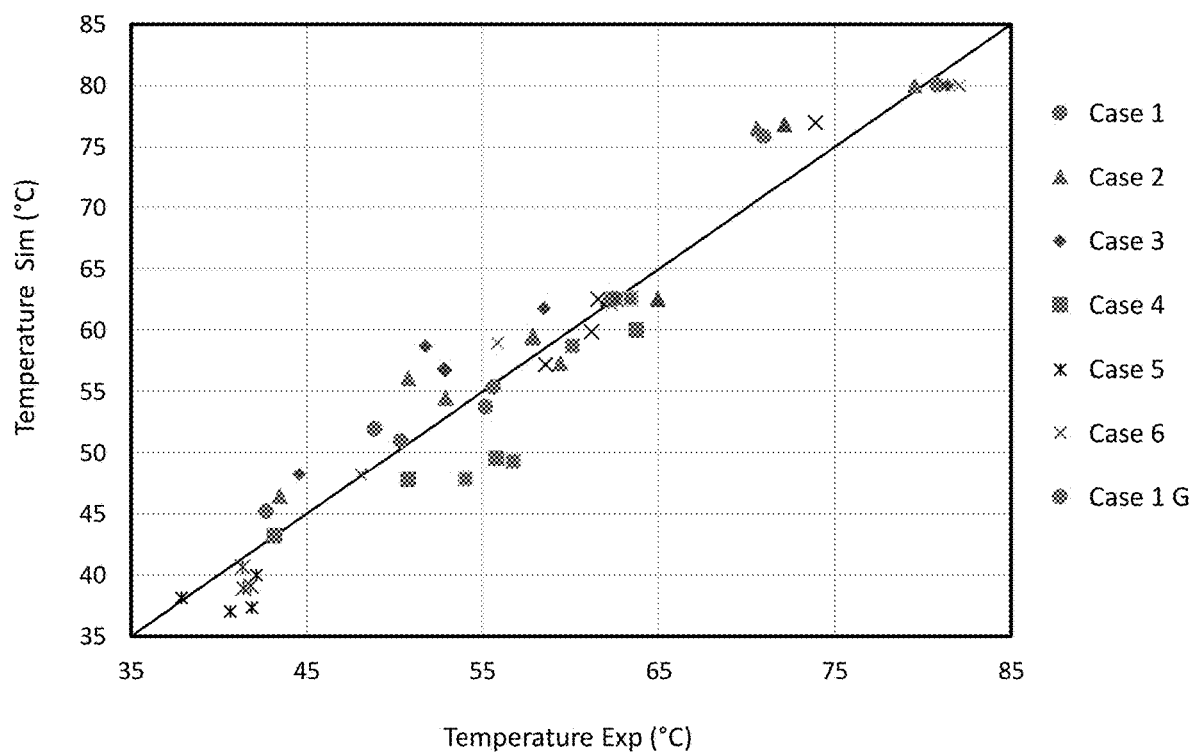
FIG. 22 shows the parity plot for an uncooled air-$H_2O$ system, with the experimental vs simulated by the MFIX model.

The concordance between experimental and simulated temperature profiles is remarkably close. The accuracy of MFIX predictions for the rest of the uncooled cases was similarly satisfactory as the relative deviation from experimental results was between 0-14%, with most well under 10%. A comparison between experimental and simulation results for all data points is presented in a parity plot, shown in FIG. 22. The cases shown in the plot are the ones outlined in Table 1. The parity plot demonstrates the predictive power of the model at various experimental conditions, for both air and gas, as the data do not stray far from the perfect parity line.

Figure 23:
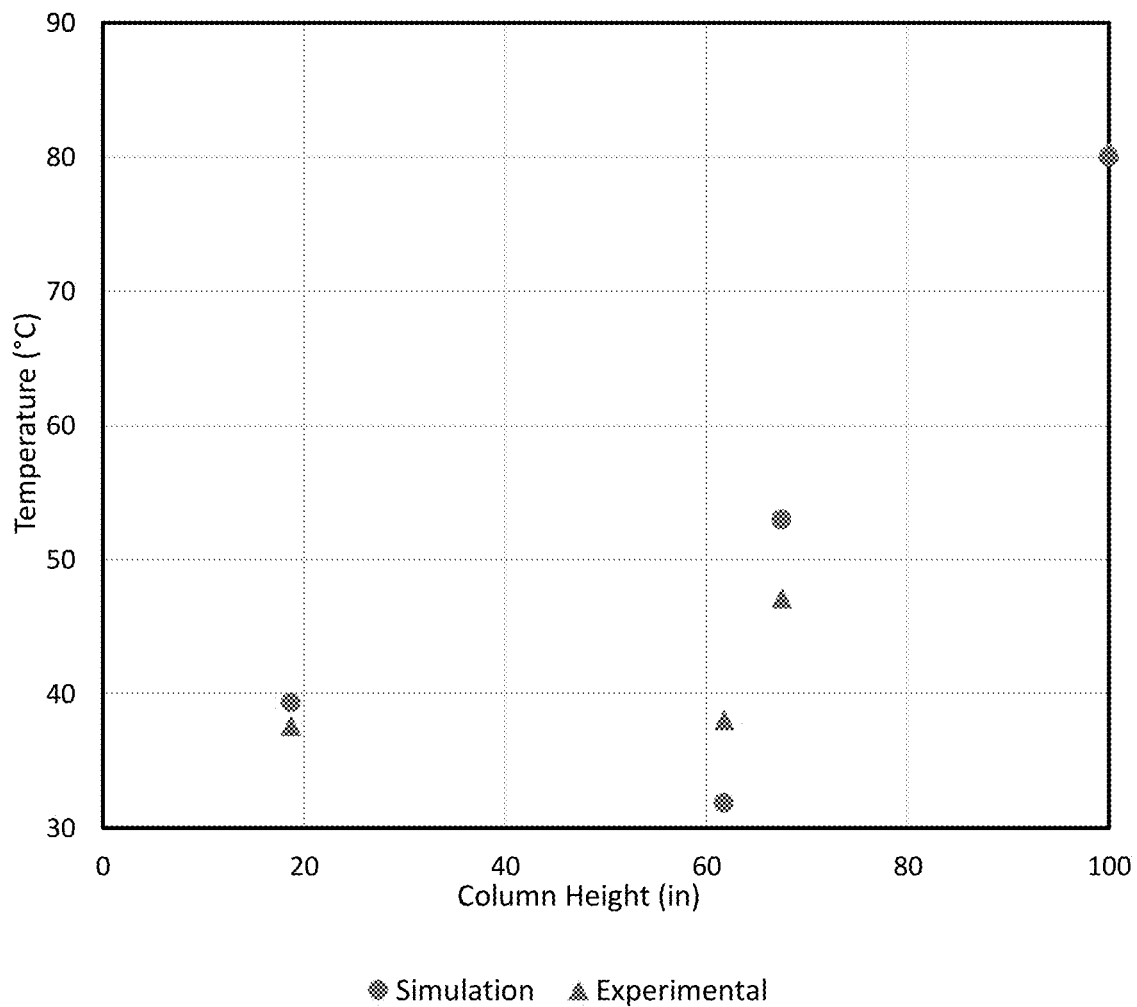
FIG. 23 shows a comparison of cooled temperature profile between MFIX simulation and experimental results.
Figure 24:
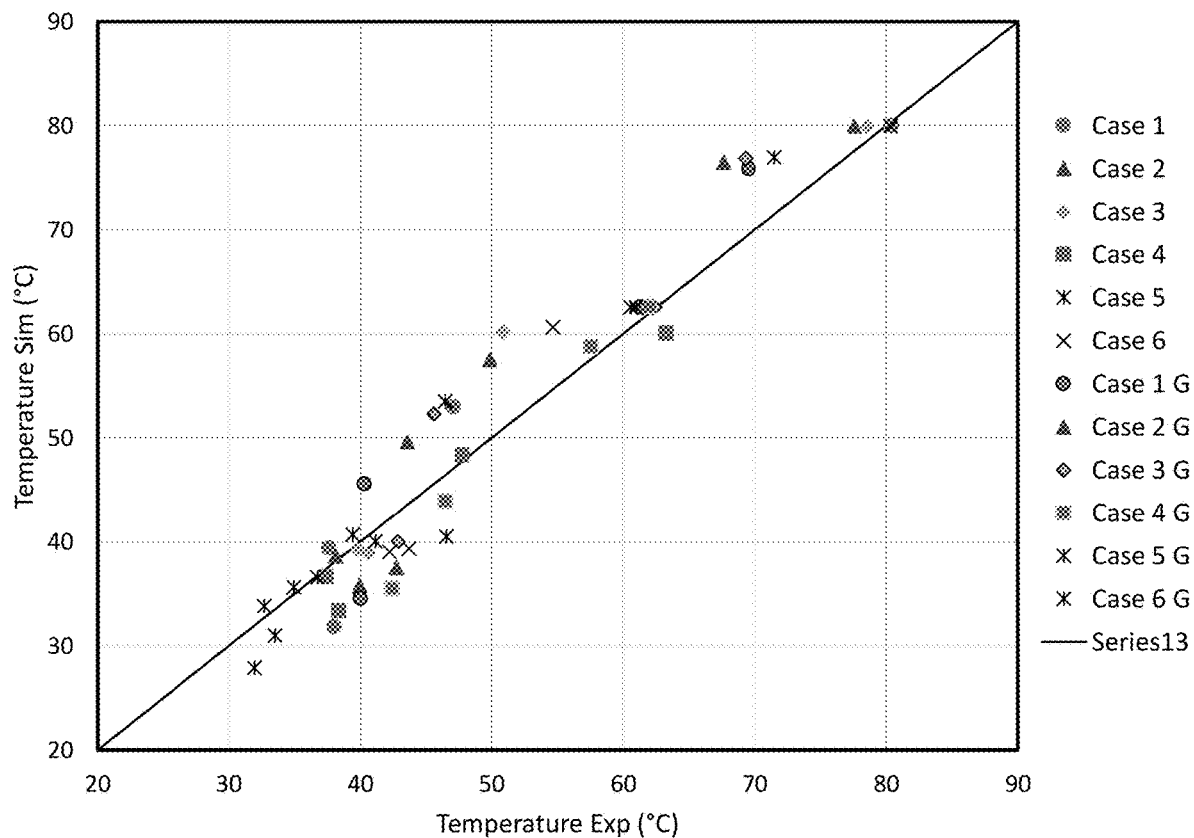
FIG. 24 shows a parity plot for a cooled air-$H_2O$ system, with the experimental vs simulated by the MFIX model.

Simulations that incorporated cooling by the intensified device were also performed on MFIX. A comparison between the simulated and experimental cooled temperature profile is shown in FIG. 23. The accuracy of the MFIX predictions is still reasonably close although less so than for the uncooled case. The simulation successfully predicted the final value of the liquid temperature profile (at the lowest point), but deviated for the two middle values. The remaining cooled cases demonstrate a similar pattern; consequently, there is a wider spread in the relative deviation from experimental data for cooled cases which ranged from 0 to 19%. A comparison of all cooled cases is presented in a parity plot, shown in FIG. 24. Compared to the uncooled cases, the simulation for the cooled system more frequently over predicts the temperature. A possible contributing factor is that the simulation fails to predict that the liquid temperature above the intensified device is cooled down, not just the one below.

Wettability measurements revealed that the aluminum intensified device compares favorably to metal Mellapak 250 Y commercial packing elements. Wettability is an important parameter that influences the ability of the device to enhance gas and liquid phase interactions; consequently, these results, in addition to aluminum's high thermal conductivity which will enhance heat transfer, vindicate the decision to manufacture the device out of aluminum. Other materials could provide a more desirable combination of wettability and heat conductivity.

Preliminary experiments on heat transfer demonstrated the effectiveness of cooling which can be observed in the dramatic temperature reduction achieved in gas that flowed through the intensified device, which was as high as 81.5% for 520 LPM. For some gas flow rates, the entire top half of the column was held close to room temperature even at input gas temperatures exceeding 100° C. due to heat losses through the wall. As expected, the effect of the cooling was less dramatic in the irrigated system than in the air alone system due to water's higher heat capacity, as well as vaporization of water into air that reduces the temperature of the whole system. Heat exchange by the packing device of the invention still had a measurable impact and was able to reduce the temperature of the water by up to 23.4%. The heat transfer coefficient of the irrigated system under the tested conditions exhibited close agreement between different flow rates and varied between 32.5 and 34.9 W/° C.-m$^2$.

The invention when disposed inside the column performs both heat transfer and mass transfer enhancement. The packing device of the invention can be disposed at one or multiple locations along the column, at locations where a respective temperature bulge is expected. The invention can be configured to do in situ heat transfer and thus remove the need of external heat exchangers. Using the device described here, the $CO_2$ capture efficiency increased by as much as 15%. In a similar application, Instead of MEA, a nonaqueous solvent may be used.

The microchanneled corrugated plates can be manufactured by 3D printing (additively manufactured) a metal that is 3D printable, such as Al, Ti, and the like. The microchanneled corrugated plates can also be manufactured by 3D printing one or more polymers. In one example, the fabricated microchanneled corrugated plates have a porosity in a range of 0.01-1 µm. A thickness of the corrugated plates is 2-5 mm, and a width of the microchannel inside a corrugated plate is 20%-80% of the thickness of the corrugated plate.

The packing device of the invention can also be used in distillation columns. Many of the existing distillation columns have external heat exchangers to add or remove heat from the fluids. The packing device of the invention can be used in situ to avoid rerouting the fluids from inside the column through externally located heat exchangers to remove or add heat. Additionally, the disclosed device can also be used in liquid-liquid extraction columns. Like in absorption columns, when reactive liquids are used in liquid extraction using structured packing devices, depending on the heat of reaction, there may be a need to remove or add heat to the liquids. This can be done in situ by using the disclosed device.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A packing device for mass and heat transfer with a subject fluid, comprising:
   a housing having opposing ends, and subject fluid openings at each opposing end defining a subject fluid flow path for at least one subject fluid flowing through the packing device;
   a plurality of mass and heat transfer plates each comprising opposing mass and heat transfer sides, the mass and heat transfer sides comprising interior heat transfer surfaces and exterior mass and heat transfer surfaces for contacting the at least one subject fluid, and an interior heat exchange fluid channel disposed between the interior heat transfer surfaces of the mass and heat transfer sides;
   a heat exchange fluid inlet for supplying heat exchange fluid to the heat exchange fluid channels of the mass and heat transfer plates, and a heat exchange fluid outlet for removing heat exchange fluid from the heat exchange fluid channels of the mass and heat transfer plates;
   the mass and heat transfer plates being oriented with the exterior mass and heat transfer surfaces aligned with the subject fluid flow path and to the exterior mass and heat transfer surfaces of adjacent mass and heat transfer plates, the mass and heat transfer plates defining there between fluid flow channels for the subject fluid;
   wherein the mass and heat transfer plates are corrugated, and wherein the corrugations of adjacent mass and heat transfer plates comprise joined portions.

2. The packing device of claim 1, wherein the corrugations are offset from the flow path at an acute angle.

3. The packing device of claim 2, wherein the offset between the corrugations of adjacent mass and heat transfer plates is from 30 to 150 degrees.

4. The packing device of claim 1, wherein the joined portions are interpenetrating.

5. The packing device of claim 1, wherein the mass and heat transfer plates comprise alternating corrugated plates and non-corrugated plates.

6. The packing device of claim 1, wherein the exterior mass and heat transfer surfaces comprise projecting portions.

7. The packing device of claim 1, comprising a contact surface area between the heat exchange fluid channel and the interior heat transfer surfaces of the mass and heat transfer sides of a mass and heat transfer plate, and wherein the contact surface area comprises from 10% of the surface area of the exterior mass and heat transfer surfaces of the plate.

8. The packing device of claim 1, comprising a contact surface area between the heat exchange fluid channel and the interior heat transfer surfaces of the mass and heat transfer sides of a mass and heat transfer plate, and wherein the contact surface area comprises at least 90% of the surface area of the exterior mass and heat transfer surfaces of the plate.

9. The packing device of claim 1, wherein the interior heat transfer surfaces of the mass and heat transfer sides and the heat exchange fluid channel are planar and parallel.

10. A packing device for mass and heat transfer with a subject fluid, comprising:
- a housing having opposing ends, and subject fluid openings at each opposing end defining a subject fluid flow path for at least one subject fluid flowing through the packing device;
- a plurality of mass and heat transfer plates each comprising opposing mass and heat transfer sides, the mass and heat transfer sides comprising interior heat transfer surfaces and exterior mass and heat transfer surfaces for contacting the at least one subject fluid, and an interior heat exchange fluid channel disposed between the interior heat transfer surfaces of the mass and heat transfer sides;
- a heat exchange fluid inlet for supplying heat exchange fluid to the heat exchange fluid channels of the mass and heat transfer plates, and a heat exchange fluid outlet for removing heat exchange fluid from the heat exchange fluid channels of the mass and heat transfer plates;
- the mass and heat transfer plates being oriented with the exterior mass and heat transfer surfaces aligned with the subject fluid flow path and to the exterior mass and heat transfer surfaces of adjacent mass and heat transfer plates, the mass and heat transfer plates defining there between fluid flow channels for the subject fluid,
- wherein the housing is tubular and comprises an annular heat exchange fluid inlet manifold and an annular heat exchange fluid outlet manifold at the opposing ends of the housing, the annular heat exchange fluid inlet manifold communicating between the heat exchange fluid inlet and the heat exchange fluid channels of the mass and heat transfer plates, the annular heat exchange fluid outlet manifold communicating between the heat exchange fluid channels of the mass and heat transfer plates and the heat exchange fluid outlet.

11. The packing device of claim 10, wherein the mass and heat transfer plates are corrugated.

12. The packing device of claim 11, wherein the corrugations are offset from the flow path at an acute angle.

13. The packing device of claim 12, wherein the offset between the corrugations of adjacent mass and heat transfer plates is from 30 to 150 degrees.

14. The packing device of claim 11, wherein the corrugations of adjacent mass and heat transfer plates comprise joined portions.

15. The packing device of claim 14, wherein the joined portions are interpenetrating.

16. The packing device of claim 11, wherein the mass and heat transfer plates comprise alternating corrugated plates and non-corrugated plates.

17. The packing device of claim 10, wherein the exterior mass and heat transfer surfaces comprise projecting portions.

18. The packing device of claim 10, comprising a contact surface area between the heat exchange fluid channel and the interior heat transfer surfaces of the mass and heat transfer sides of a mass and heat transfer plate, and wherein the contact surface area comprises from 10% of the surface area of the exterior mass and heat transfer surfaces of the plate.

19. The packing device of claim 10, comprising a contact surface area between the heat exchange fluid channel and the interior heat transfer surfaces of the mass and heat transfer sides of a mass and heat transfer plate, and wherein the contact surface area comprises at least 90% of the surface area of the exterior mass and heat transfer surfaces of the plate.

20. The packing device of claim 10, wherein the interior heat transfer surfaces of the mass and heat transfer sides and the heat exchange fluid channel are planar and parallel.

* * * * *